(12) United States Patent
Choi et al.

(10) Patent No.: US 9,051,433 B2
(45) Date of Patent: Jun. 9, 2015

(54) POLYMER AND CROSS-LINKED POLYMER COMPOSITION, ELECTRODE AND ELECTROLYTE MEMBRANE INCLUDING CROSS-LINKED POLYMER, AND FUEL CELL INCLUDING ELECTRODE AND ELECTROLYTE MEMBRANE

(75) Inventors: Seong-woo Choi, Yongin-si (KR); Jong-chan Lee, Seoul (KR); Jung-ock Park, Yongin-si (KR); Sung-kon Kim, Seoul (KR); Jung-woo Jung, Seoul (KR)

(73) Assignees: SAMSUNG ELECTRONICS CO., LTD. (KR); SNU R&DB FOUNDATION (KR)

( * ) Notice: Subject to any disclaimer, the term of this patent is extended or adjusted under 35 U.S.C. 154(b) by 635 days.

(21) Appl. No.: 13/019,625

(22) Filed: Feb. 2, 2011

(65) Prior Publication Data
US 2011/0189584 A1 Aug. 4, 2011

(30) Foreign Application Priority Data

Feb. 4, 2010 (KR) .......... 10-2010-0010496
Jan. 21, 2011 (KR) .......... 10-2011-0006493

(51) Int. Cl.
*C08L 77/00* (2006.01)
*C08G 75/32* (2006.01)
*C08G 81/00* (2006.01)
*H01M 8/10* (2006.01)

(52) U.S. Cl.
CPC ............. *C08G 75/32* (2013.01); *Y02E 60/521* (2013.01); *C08G 81/00* (2013.01); *H01M 8/10* (2013.01)

(58) Field of Classification Search
CPC ...................................... C08G 75/32
USPC .............. 429/483, 33; 525/432; 528/321
See application file for complete search history.

(56) References Cited

U.S. PATENT DOCUMENTS

| 4,533,692 | A | * | 8/1985 | Wolfe et al. | 524/417 |
| 4,533,724 | A | * | 8/1985 | Wolfe et al. | 528/313 |
| 4,554,119 | A | * | 11/1985 | Chenevey | 264/85 |

(Continued)

FOREIGN PATENT DOCUMENTS

| JP | 8-504293 | 5/1996 |
| JP | 11-97011 | 4/1999 |

(Continued)

OTHER PUBLICATIONS

Stephen J. Krause et al., "Morphology and mechanical properties of a phase separated and a molecular composite 30% PBT/70% ABPBI triblock copolymer", *Polymer*, 1988, vol. 29, pp. 195-206.

(Continued)

*Primary Examiner* — Shane Fang
(74) *Attorney, Agent, or Firm* — Cantor Colburn LLP

(57) ABSTRACT

A polymer composition, a cross-linked polymer formed therefrom, an electrolyte membrane and electrode for a fuel cell including the same, and a fuel cell employing the electrode and the electrolyte membrane. The cross-linked polymer includes an oxazine-based monomer capable of retaining phosphoric acid and has excellent mechanical strength. When the cross-linked polymer is used, an electrode and electrolyte membrane for a fuel cell with enhanced capability of retaining phosphoric acid at a wide range of temperature may be manufactured, leading to long-term durability, and enhanced proton conductivity.

2 Claims, 3 Drawing Sheets

(56) References Cited

U.S. PATENT DOCUMENTS

| | | |
|---|---|---|
| 4,772,678 A | 9/1988 | Sybert et al. |
| 5,723,086 A | 3/1998 | Ledjeff et al. |
| 2005/0256296 A1 | 11/2005 | Kiefer et al. |
| 2006/0211844 A1 | 9/2006 | Kim et al. |
| 2007/0020507 A1 | 1/2007 | Kim et al. |
| 2007/0184323 A1* | 8/2007 | Lee et al. ............... 429/33 |
| 2008/0145743 A1 | 6/2008 | Choi et al. |
| 2009/0098437 A1 | 4/2009 | Choi et al. |
| 2009/0117436 A1 | 5/2009 | Choi et al. |
| 2010/0159347 A1 | 6/2010 | Choi et al. |

FOREIGN PATENT DOCUMENTS

| | | |
|---|---|---|
| JP | 2003-255487 | 9/2003 |
| JP | 2003-257491 | 9/2003 |
| JP | 2005-85638 | 3/2005 |
| JP | 2007-188753 | 7/2007 |
| JP | 2007-519183 | 7/2007 |
| KR | 10-2006-0001625 | 1/2006 |
| KR | 10-2006-0100689 | 9/2006 |
| KR | 10-2006-0108792 | 10/2006 |
| KR | 10-2007-0080483 | 8/2007 |
| KR | 10-2008-0008754 | 1/2008 |
| KR | 10-0829554 | 5/2008 |
| KR | 10-2008-0055510 | 6/2008 |
| KR | 10-2009-0027183 | 3/2009 |
| KR | 10-2009-0037117 | 4/2009 |
| KR | 10-2009-0045655 | 5/2009 |
| KR | 10-2010-0069625 | 6/2010 |
| WO | WO 2005/060444 | 7/2005 |
| WO | WO 2005/063852 | 7/2005 |

OTHER PUBLICATIONS

Yi-Che Su et al., "Synthesis and characterization of fluorinated polybenzoxazine material with low dielectric constant", *Polymer 44* (2003) pp. 7989-7996.

Juan Antonio Asensio et al., "Polymer Electrolyte Fuel Cells Based on Phosphoric Acid-Impregnated Poly (2, 5-benzimidazole) Membranes", *Journal of the Electrochemical Society*, 151 (2004), pp. A304-A310.

Hyoung-Juhn Kim et al., "Polybenzimidazoles for High Temperature Fuel Cell Applications", *Macromolecular Rapid Commun.* 2004, 25, pp. 1410-1413.

Palanichamy Krishnan et al., "Performance of a poly(2,5-benzimidazole) membrane based high temperature PEM fuel cell in the presence of carbon monoxide", *Journal of Power Sources 159* (2006), pp. 817-823.

Jeong-Hi Kim et al., "Dependence of the performance of a high-temperature polymer electrolyte fuel cell on phosphoric acid-doped polybenzimidazole ionomer content in cathode catalyst layer", *Journal of Power Sources 170* (2007), pp. 275-280.

C. Wannek et al., "Durability of ABPBI-based MEAs for High Temperature PEMFCs at Different Operating Conditions", *Fuel Cells 08*, 2008, No. 2, pp. 87-95.

U.S. Appl. No. 13/019,591, filed Feb. 2, 2011, Seong-woo Choi et al., Samsung Electronics Co., Ltd. and Snu R&DB Foundation.

U.S. Appl. No. 13/020,385, filed Feb. 3, 2011, Seong-woo Choi et al., Samsung Electronics Co., Ltd.

U.S. Appl. No. 13/020,035, filed Feb. 3, 2011, Seong-woo Choi et al., Samsung Electronics Co., Ltd. and Snu R&DB Foundation.

U.S. Appl. No. 13/039,745, filed Mar. 3, 2011, Jung-ock Park et al., Samsung Electronics Co., Ltd. and BASF SE.

* cited by examiner

POLYMER AND CROSS-LINKED POLYMER COMPOSITION, ELECTRODE AND ELECTROLYTE MEMBRANE INCLUDING CROSS-LINKED POLYMER, AND FUEL CELL INCLUDING ELECTRODE AND ELECTROLYTE MEMBRANE

CROSS-REFERENCE TO RELATED APPLICATIONS

This application claims the benefit of Korean Patent Application Nos. 10-2010-0010496, filed on Feb. 4, 2010, and 10-2011-0006493, filed on Jan. 21, 2011, both filed in the Korean Intellectual Property Office, the disclosures of which are incorporated herein by reference.

BACKGROUND

1. Field

Aspects of the present disclosure relate to polymer compositions, cross-linked polymers formed therefrom, electrodes and electrolyte membranes for a fuel cell including the cross-linked polymers, and fuel cells including the electrodes and the electrolyte membranes.

2. Description of the Related Art

Fuel cells that include a polymer electrolyte membrane operate at relatively low temperatures and may be manufactured in small size. Thus, such fuel cells are expected to be used as energy sources in electric vehicles and in distributed generation systems. Perfluorocarbon sulfonic acid-based polymer membranes, such as NAFION membranes (registered trade mark), are commonly used as polymer electrolyte membranes for fuel cells.

However, such polymer electrolyte membranes should be humidified, in order to sufficiently conduct protons. In addition, to enhance cell system efficiencies, polymer electrolyte membranes should be operated at high temperatures, i.e., 100° C. or more. However, the moisture in the polymer electrolyte membrane is evaporated and depleted at such temperatures, which reduces the effectiveness thereof.

To address such problems and/or other problems in the related art, non-humidified electrolyte membranes, which may operate at temperatures of 100° C. or more, without humidification, have been developed. For example, polybenzimidazole doped with phosphoric acid is disclosed as a material for a non-humidified electrolyte membrane.

In addition, phosphoric acid fuel cells, which operate at temperatures of from 150 to 200° C., include a liquid phosphoric acid electrolyte. However, the liquid phosphoric acid included in a large amount in electrodes interferes with gas diffusion in the electrodes. Therefore, an electrode catalyst layer that includes a polytetrafluoroethylene (PTFE) waterproofing agent, which prevents fine pores in the electrodes from being clogged by the phosphoric acid, has been used.

In fuel cells employing a phosphoric acid-impregnated polybenzimidazole (PBI) electrolyte membrane as a high-temperature, non-humidified electrolyte, in order to promote contact between an electrode and an electrolyte membrane, attempts have been made to impregnate an electrode with liquid phosphoric acid and to load a larger quantity of a metal catalyst. However, the mechanical characteristics, chemical stability and phosphoric acid-retaining capability of such fuel cells may not be satisfactory, and thus, there is still a demand for improvement.

SUMMARY

Aspects of the present invention provide polymer compositions having enhanced mechanical strength, cross-linked polymers formed therefrom, electrodes and electrolyte membranes for a fuel cell including the same, and fuel cells including the electrodes and the electrolyte membranes.

According to an aspect of the present invention, a polymer composition includes a polymer having a first repeating unit represented by Formula 1 below and a second repeating unit represented by Formula 2 below, and an oxazine-based monomer.

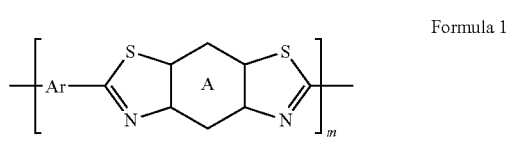

Formula 1 wherein, in Formula 1,

A is $$\begin{array}{c}\text{hexagon}\end{array}$$ is $$\begin{array}{c}\text{phenyl}\end{array}$$ or $$\begin{array}{c}\text{biphenyl}\end{array}$$, Ar is a substituted or unsubstituted $C_6$-$C_{20}$ arylene group or a substituted or unsubstituted $C_3$-$C_{20}$ heteroarylene group, and m is a number from 0.01 from 1, Formula 2 wherein, in Formula 2, $R_1$ is a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, or a substituted or unsubstituted $C_3$-$C_{20}$ heteroaryloxy group, $R_2$ and $R_3$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbocyclic group or a $C_3$-$C_{20}$ heterocyclic group, and n is a number from 0 to 0.99.

Another aspect of the present invention provides a cross-linked polymer obtained through a cross-linking reaction of the polymer composition.

Another aspect of the present invention provides an electrolyte membrane for a fuel cell including the polymer composition described above or the cross-linked polymer described above.

Another aspect of the present invention provides an electrode for a fuel cell including the polymer composition described above or the cross-linked polymer described above.

Another aspect of the present invention provides a fuel cell including a cathode, an anode, and an electrolyte membrane disposed between the cathode and the anode, wherein at least one of the cathode, the anode, and the electrolyte membrane includes the polymer composition described above or the cross-linked polymer described above.

Additional aspects and/or advantages of the invention will be set forth in part in the description which follows and, in part, will be obvious from the description, or may be learned by practice of the invention

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
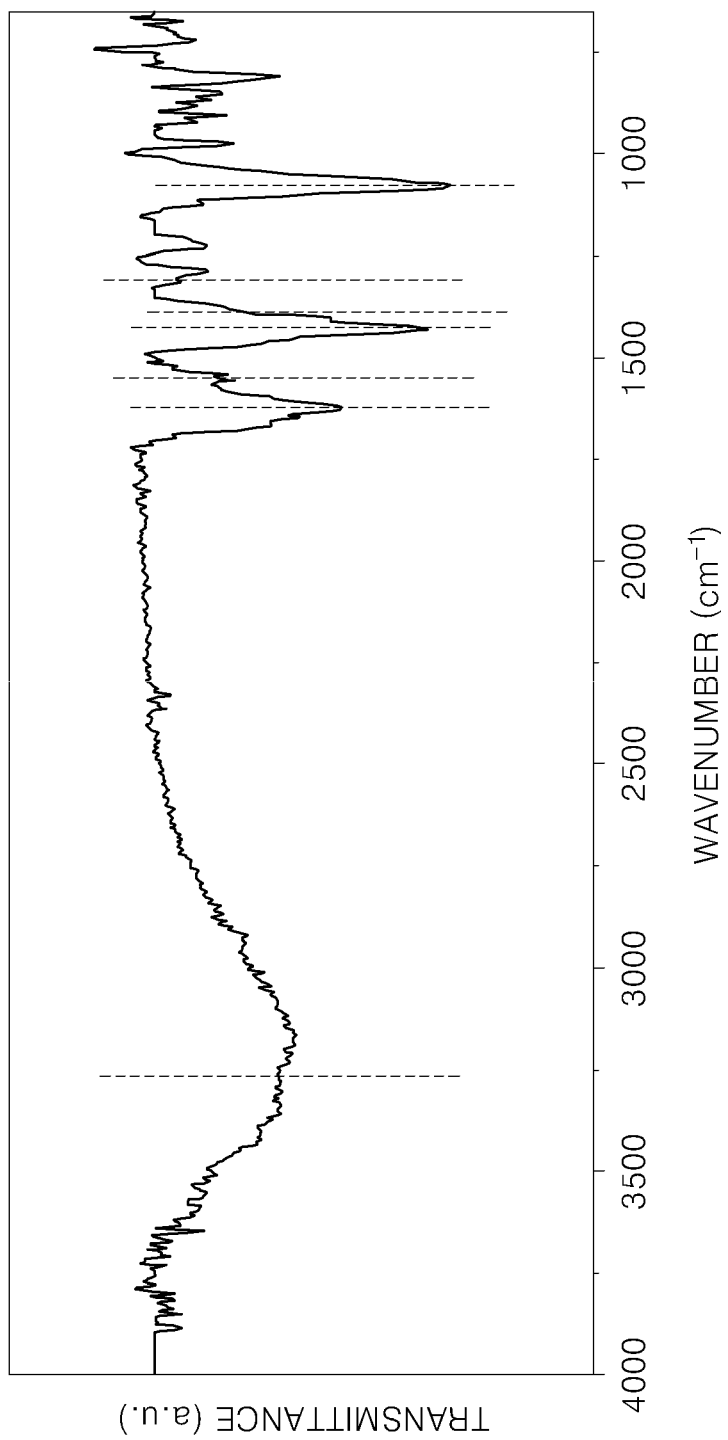
FIG. 1 illustrates an IR spectrum of a cross-linked polymer prepared according to Example 1.

Reference will now be made in detail to the present embodiments of the present invention, examples of which are illustrated in the accompanying drawings. The embodiments are described below in order to explain the present invention by referring to the.

According to embodiments of the present invention, a polymer composition is provided including a polymer having a first repeating unit represented by Formula 1 below and a second repeating unit represented by Formula 2 below and an oxazine-based monomer, and a cross-linked polymer is provided that is obtained through a cross-linking reaction of the polymer composition:

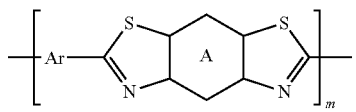

Formula 1 wherein, in Formula 1,

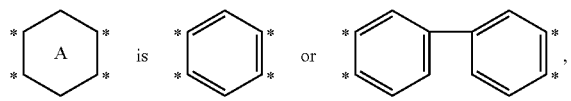

Ar is a substituted or unsubstituted $C_6$-$C_{20}$ arylene group or a substituted or unsubstituted $C_3$-$C_{20}$ heteroarylene group, and m is a number from 0.01 from 1,

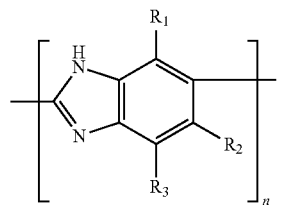

Formula 2 wherein, in Formula 2, $R_1$ and $R_2$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbon ring or a $C_3$-$C_{20}$ hetero ring, and n is a number from 0 to 0.99, for example, a number from 0.01 to 0.99.

In Formulae 1 and 2, m and n represent percentages of repeating units of the polymer. Assuming that the sum of m and n is 1, m is a number from 0.01 to 1, and n is a number from 0 to 0.99. For example, m may be a number from 0.1 to 1, and n may be a number from 0 to 0.9.

In Formulae 1 and 2, m:n may be a mixing molar ratio of the first repeating unit and the second repeating unit.

If the polymer has both the first repeating unit of Formula 1 and the second repeating unit of Formula 2, m may be a number from 0.1 to 0.9, and n may be a number from 0.1 to 0.9.

Ar is at least one selected from the groups represented by the following Formula 2A:

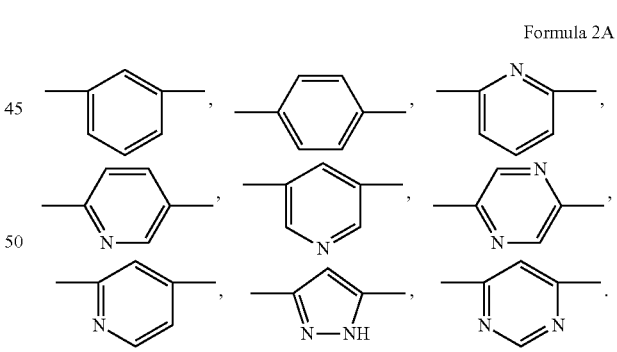

Formula 2A

The first repeating unit of Formula 1 may be one of the repeating units represented by the following Formulae 2B or 2C:

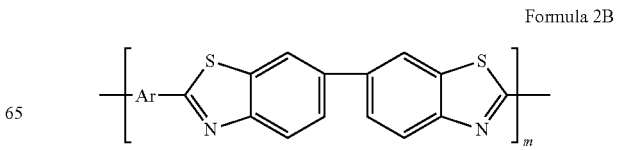

Formula 2B

Formula 2C

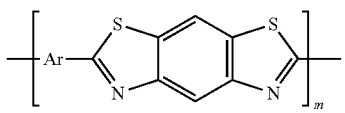

Wherein in Formulae 2B and 2C, Ar is a substituted or unsubstituted $C_6$-$C_{20}$ arylene group or a substituted or unsubstituted $C_3$-$C_{20}$ heteroarylene group, and m is a number from 0.01 from 1.

The cross-linked polymer is obtained by heat treating a mixture of a polymer including the first repeating unit represented by Formula 1 and the second repeating unit represented by Formula 2, an oxazine-based monomer, and polyphosphoric acid at a temperature in the range of about 60 to about 250° C.

In the polymer including the first repeating unit represented by Formula 1 and the second repeating unit represented by Formula 2, the amount of the second repeating unit of Formula 2 is in the range of about 0.01 to about 0.99 moles based on 1 mole of the first repeating unit of Formula 1.

A mixing ratio (for example, mixing molar ratio) of the first repeating unit of Formula 1 to the second repeating unit of Formula 2 may be in the range of about 0.1:9.9 to about 9.9:0.1, or for example, in the range of about 1:9 to about 9:1, or for another example, in the range of about 8:2 to about 2:8, for example, 8:2, 5:5, or 2:8.

The polymer may be a homopolymer having only the first repeating unit of Formula 1.

The polymer has a thiazole group, thereby having excellent phosphoric acid-retaining capacity. As the amount of sulfur introduced into the polymer increases, the cross-linking degree increases, and thus the polymer may have enhanced physical properties, such as mechanical strength.

The amount of the oxazine-based monomer may be in the range of about 10 to about 1000 parts by weight based on 100 parts by weight of the polymer having the first repeating unit of Formula 1 and the second repeating unit of Formula 2. When the amount of the oxazine-based monomer is within this range, the polymer has excellent physical properties such as mechanical strength, and when the polymer is used, an electrolyte membrane and electrode for a fuel cell can be manufactured that has a low fuel permeation rate that would have been caused by a low gas permeation rate.

The cross-linked polymer may have a structure in which a polymer of the oxazine-based monomer is graft polymerized to a side chain of the polymer including the first repeating unit represented by Formula 1 and the second repeating unit represented by Formula 2 to form a graft copolymer. Alternatively, the cross-linked polymer may have a structure in which the polymer of the oxazine-based monomer is cross-linked to a side chain of the polymer including the first repeating unit represented by Formula 1 and the second repeating unit represented by Formula 2.

The cross-linked polymer obtained using the polymer including the first repeating unit represented by Formula 1 and the second repeating unit represented by Formula 2 and the oxazine-based monomer has excellent mechanical strength and physical and chemical stability that are required for a fuel cell electrolyte membrane and/or an electrolyte membrane. Thus, an electrolyte membrane including the cross-linked polymer has a strong phosphoric acid-trapping capability, thereby having significantly enhanced capability of retaining phosphoric acid in a wide range of temperatures, such that the electrolyte membrane has long-term durability.

The polymer including the first repeating unit represented by Formula 1 and the second repeating unit represented by Formula 2 may be a copolymer having the first repeating unit of Formula 1 and the second repeating unit of Formula 2. For example, the polymer may be a block copolymer having the first repeating unit of Formula 1 and the second repeating unit of Formula 2. The block copolymer retains a rigid structure, thereby acting as a support that may maintain the shape of the electrolyte membrane, having high degree of polymerization, and having enhanced mechanical strength.

The electrolyte membrane may be used in a high-temperature, non-humidified fuel cell.

The degree of polymerization of the polymer including the first repeating unit represented by Formula 1 and the second repeating unit represented by Formula 2 may be in the range of about 1 to about 900, or for example, in the range of about 10 to about 900, or for another example, in the range of about 20 to about 900.

The polymer including the first repeating unit represented by Formula 1 and the second repeating unit represented by Formula 2 may be a compound represented by Formula 3 below:

Formula 3

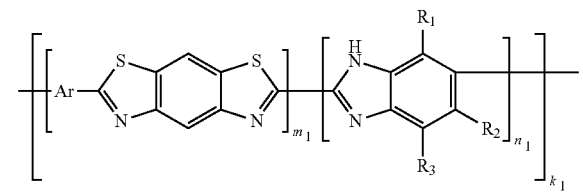

wherein, in Formula 3, $Ar_1$ is a substituted or unsubstituted $C_6$-$C_{20}$ arylene group or a substituted or unsubstituted $C_3$-$C_{20}$ heteroarylene group, $R_1$ through $R_3$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_1$-$C_{20}$ aryl group, an unsubstituted or substituted $C_1$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbon ring or a $C_3$-$C_{20}$ hetero ring, $m_1$ is from 0.01 to 1, $n_1$ is from 0 to 0.99, and $k_1$ is from 10 to 250, Formula 4

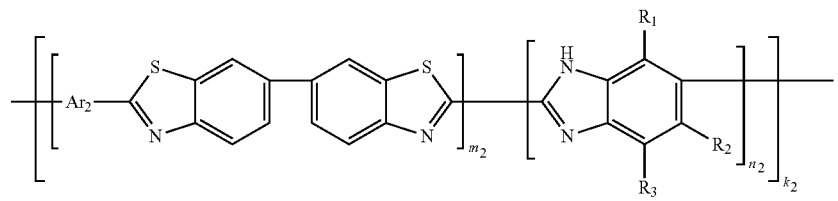

wherein, in Formula 4, $Ar_2$ is a substituted or unsubstituted $C_6$-$C_{20}$ arylene group or a substituted or unsubstituted $C_3$-$C_{20}$ heteroarylene group, $R_1$ through $R_3$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_1$-$C_{20}$ aryl group, an unsubstituted or substituted $C_1$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbon ring or a $C_3$-$C_{20}$ hetero ring, $m_2$ is from 0.01 to 1, $n_2$ is from 0 to 0.99, and $k_2$ is from 10 to 250, The polymer including the first repeating unit represented by Formula 1 and the second repeating unit represented by Formula 2 may be a compound represented by Formula 11 below:

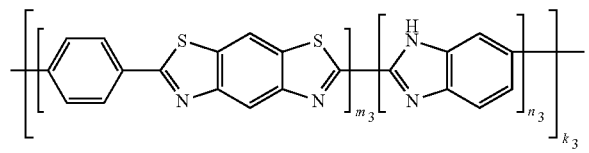

Formula 11 wherein, in Formula 11, $m_3$ is from 0.01 to 1, for example, 1 or from 0.1 to 0.9, and $n_3$ is from 0 to 0.99, for example, 0 or from 0.1 to 0.9, and $k_3$ is from 10 to 250.

A method of preparing the polymer including the first repeating unit represented by Formula 1 and the second repeating unit represented by Formula 2 will now be described, wherein the polymer including the first repeating unit represented by Formula 1 and the second repeating unit represented by Formula 2 is, for example, the polymer of Formula 3.

Compound (A), compound (B), and compound (C) are dissolved in polyphosphoric acid at a temperature in the range of about 60 to about 150° C., and the mixture was heat treated to synthesize the polymer of Formula 3:

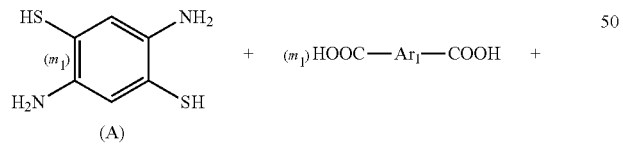

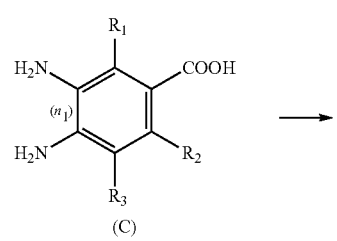

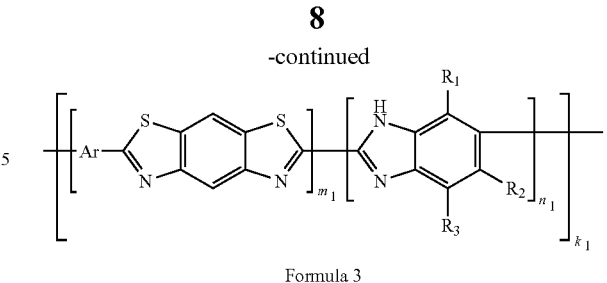

Formula 3 wherein, in Compound (A), Compound (B), and Compound (C) shown in Reaction Scheme 1 above, and Formula 3, $Ar_1$ is a substituted or unsubstituted $C_6$-$C_{20}$ arylene group or a substituted or unsubstituted $C_3$-$C_{20}$ heteroarylene group, $R_1$ through $R_3$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_1$-$C_{20}$ aryl group, an unsubstituted or substituted $C_1$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbon ring or a $C_3$-$C_{20}$ hetero ring, $m_1$ is from 0.01 to 1, $n_1$ is from 0 to 0.99, and $k_1$ is from 10 to about 250, Examples of the polyphosphoric acid include known phosphoric acids, for example, available from Riedel-de Haen Inc. The concentration of the polyphosphoric acid, which is represented by $H_{n+2}P_nO_{3n+1}$ (n>1), may be at least 85%, calculated as $P_2O_5$ (by acidimetry).

The amount of the polyphosphoric acid is in the range of about 1000 to about 4000 parts by weight based on 100 parts by weight of Compound (A).

The heat treatment may be performed at a temperature in the range of about 60 to about 250° C.

The oxazine-based monomer may be at least one selected from the group consisting of compounds represented by Formulae 5 through 10 below, but are not limited thereto:

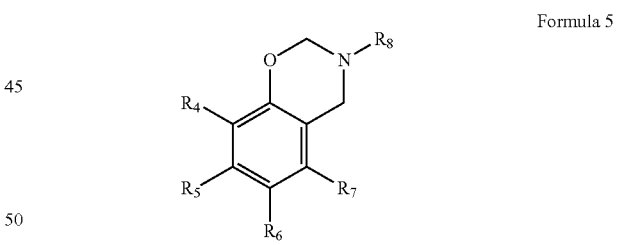

Formula 5 wherein, in Formula 5, $R_4$ through $R_7$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$-carbocyclic alkyl group, a substituted or unsubstituted $C_2$-$C_{20}$ heterocyclic group, a halogen atom, a hydroxyl group, or a cyano group, and $R_8$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_8$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, Formula 6

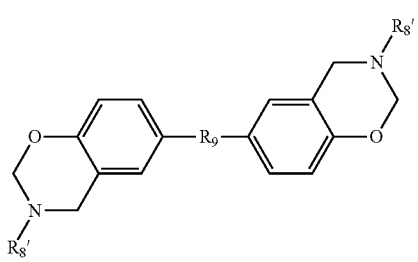

wherein, in Formula 6, $R_8'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_8$-$C_{20}$ aryl group, a substituted or unsubstituted $C_8$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, and $R_9$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—, Formula 7

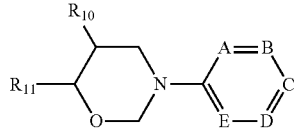

wherein, in Formula 7, A, B, C, D and E are all carbon; or one or two of A, B, C, D and E is nitrogen and the others are carbon, and $R_{10}$ and $R_{11}$ are linked to form a ring, wherein the ring is a $C_6$-$C_{10}$ carbocyclic group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group, Formula 8

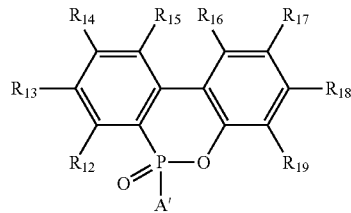

wherein, in Formula 8, A' is a substituted or unsubstituted $C_1$-$C_{20}$ heterocyclic group, a substituted or unsubstituted $C_4$-$C_{20}$ cycloalkyl group, or a substituted $C_1$-$C_{20}$ alkyl group and wherein A includes at least one oxazine moiety, and $R_{12}$ through $R_{19}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxyl group,

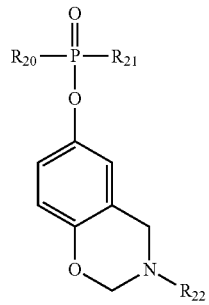

wherein, in Formula 9 and 9A, $R_{20}$ and $R_{21}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 9A below.

Formula 9A

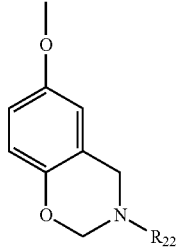

wherein, in Formulae 9 and 9A, $R_{22}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group, Formula 10

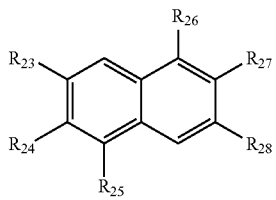

wherein, in Formula 10, at least two adjacent groups selected from among $R_{23}$, $R_{24}$ and $R_{25}$ are linked to form a group represented by Formula 10A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group, and at least two adjacent groups selected from among $R_{26}$, $R_{27}$ and $R_{28}$ are linked to form the group represented by Formula 2A below, and the non-selected, remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group, Formula 10A

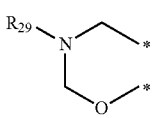

wherein, in Formula 10A, $R_{29}$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group, and

* denotes the sites at which the at least two adjacent groups selected from among $R_{23}$, $R_{24}$ and $R_{25}$ of Formula 10 and the at least two adjacent groups selected from among $R_{26}$, $R_{27}$ and $R_{28}$ are linked, respectively.

In Formula 10A, $R_{29}$ is selected from the groups represented by Formula 10B below:

Formula 10B

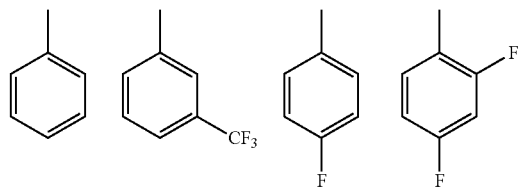

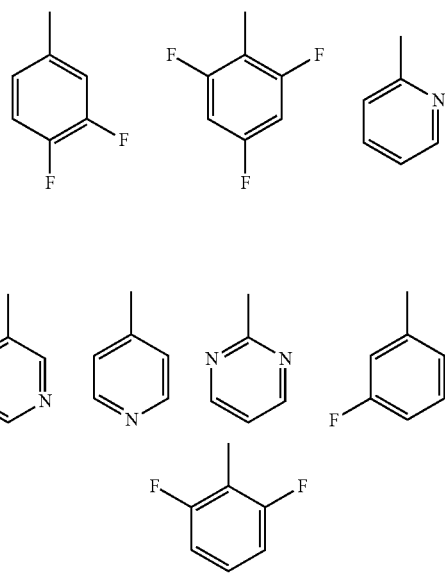

Examples of the compound of Formula 5 may include compounds represented by the following Formulae 12-60:

[Formula 12]

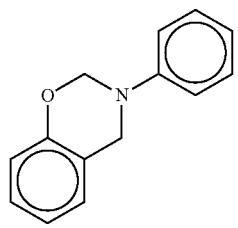

[Formula 13]

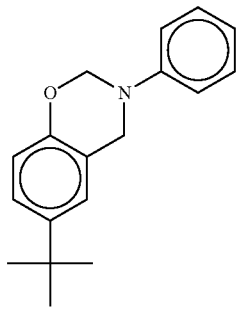

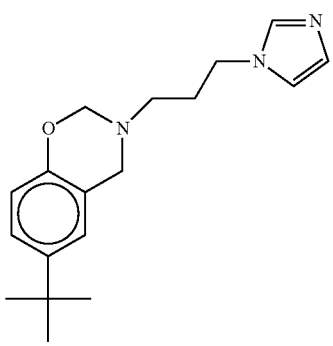
[Formula 14]
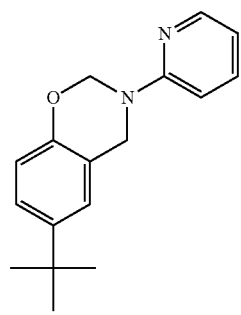
[Formula 18]
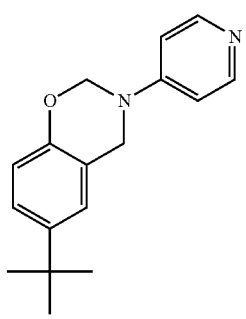
[Formula 19]
[Formula 15]
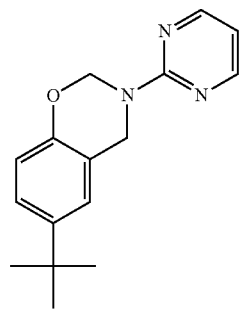
[Formula 20]
[Formula 16]
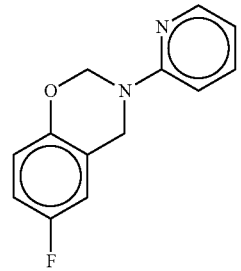
[Formula 21]
[Formula 17]
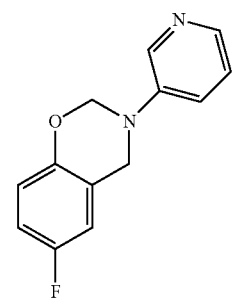
[Formula 22]

-continued
[Formula 23]
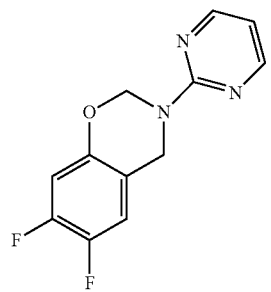
[Formula 24]
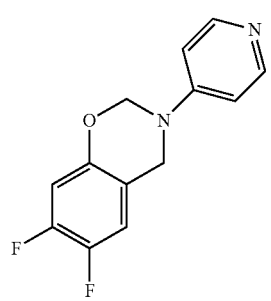
[Formula 25]
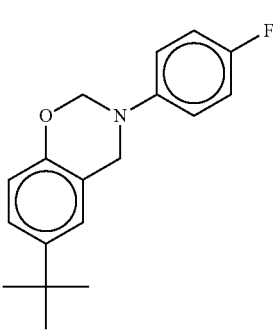
[Formula 26]
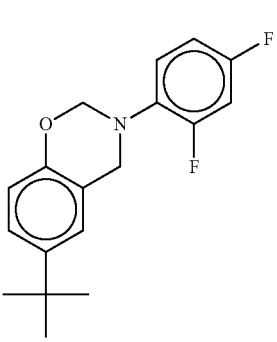
[Formula 27]
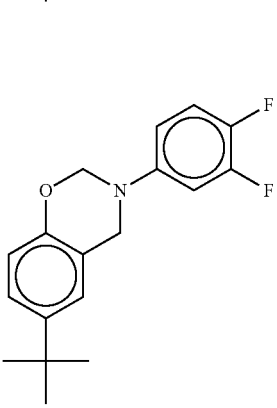
[Formula 28]
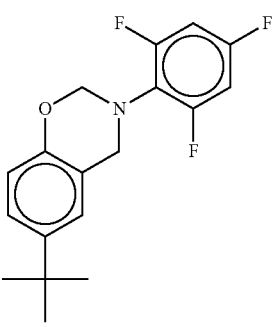
[Formula 29]
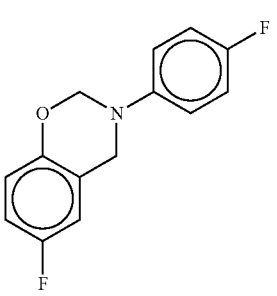
[Formula 30]
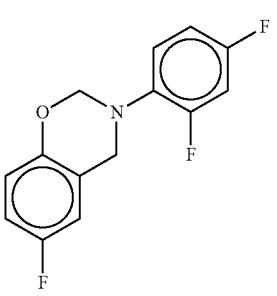
[Formula 31]
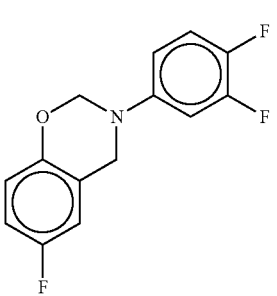
[Formula 32]
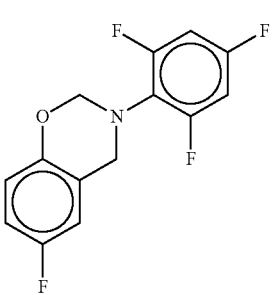

-continued
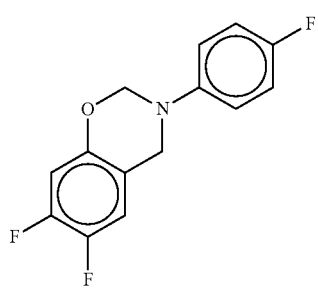
[Formula 33]
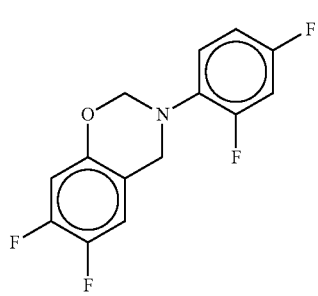
[Formula 34]
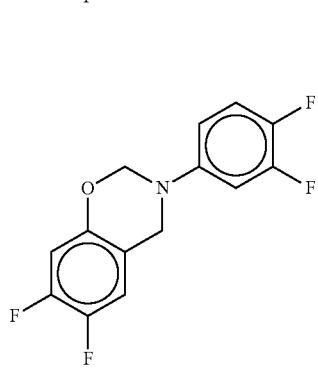
[Formula 35]
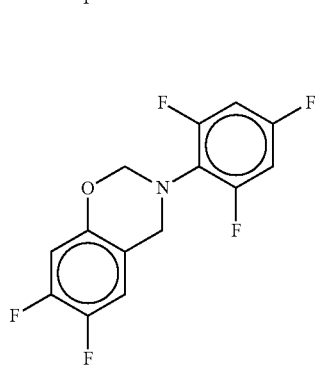
[Formula 36]
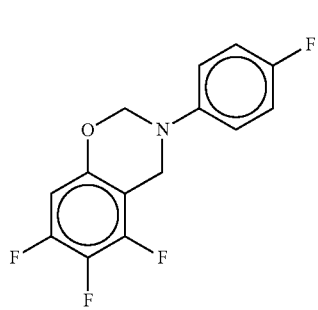
[Formula 37]
-continued
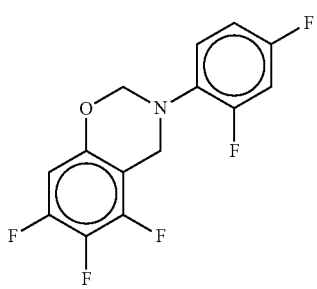
[Formula 38]
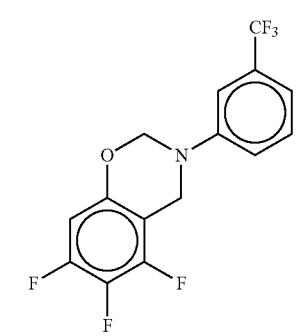
[Formula 39]
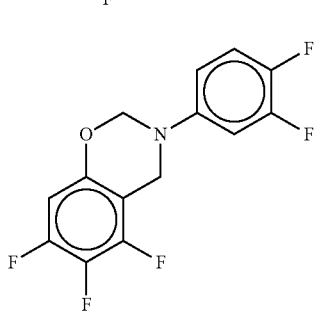
[Formula 40]
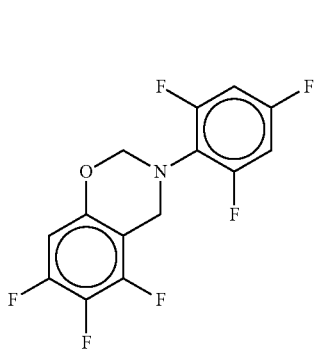
[Formula 41]
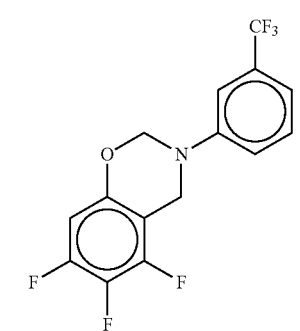
[Formula 42]

-continued
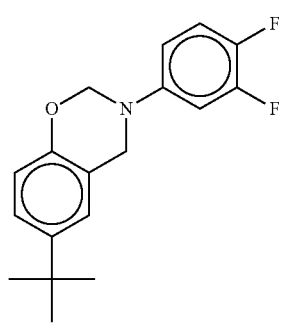
[Formula 43]
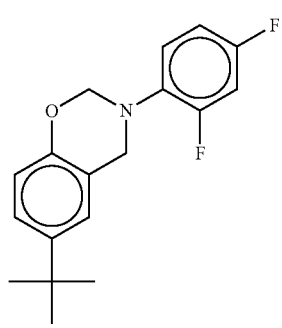
[Formula 44]
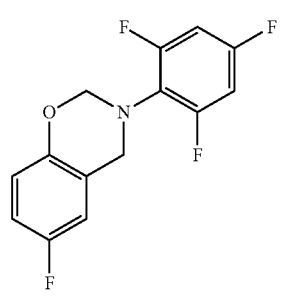
[Formula 45]
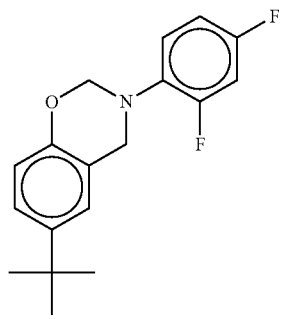
[Formula 46]
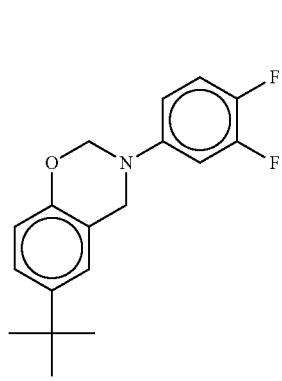
[Formula 47]
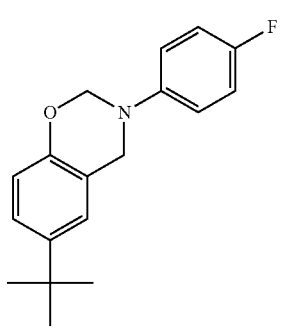
[Formula 48]
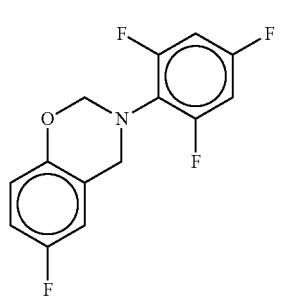
[Formula 49]
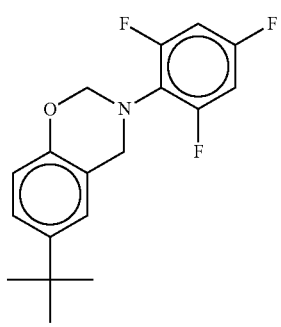
[Formula 50]
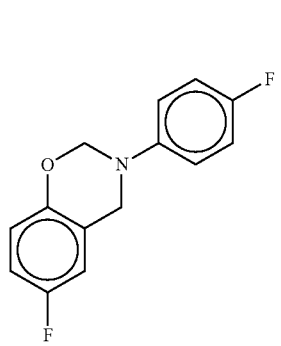
[Formula 51]
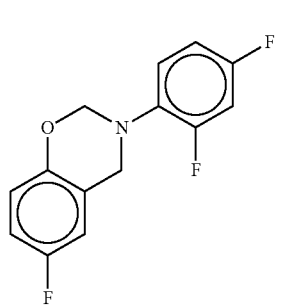
[Formula 52]

[Formula 53]
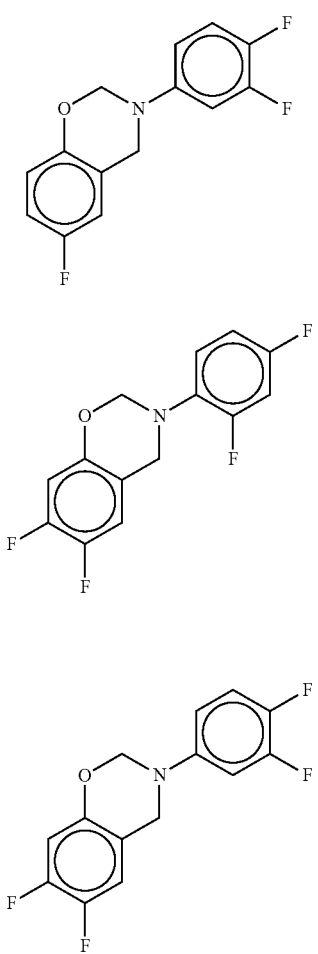
[Formula 54]
[Formula 55]
[Formula 56]
[Formula 57]
[Formula 58]
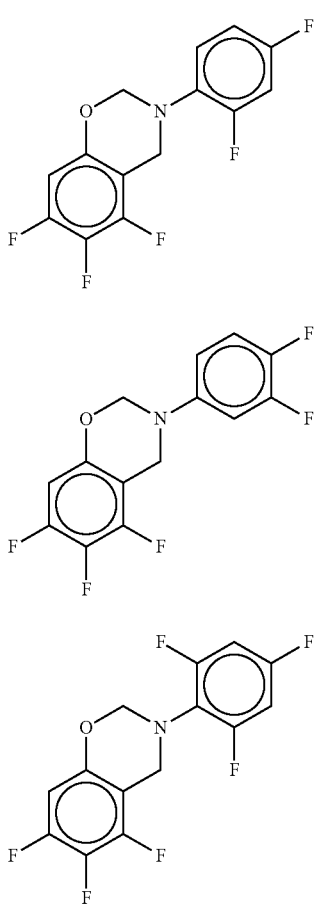
[Formula 59]
[Formula 60]
Examples of the compound of Formula 6 may include compounds represented by the following Formulae 61-65.
[Formula 61]
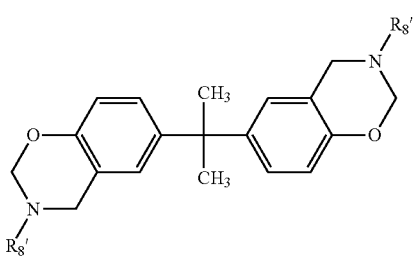
[Formula 62]
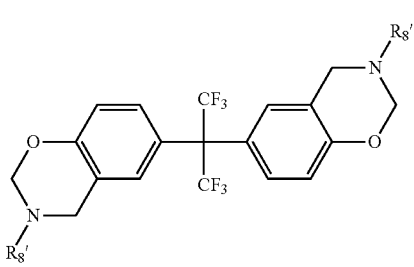

[Formula 63]
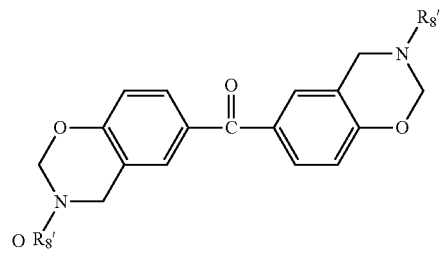
[Formula 64]
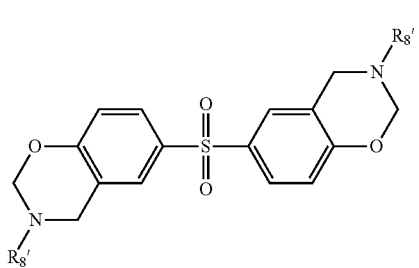
[Formula 65]
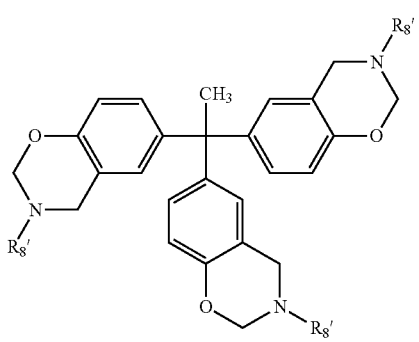
In the formulae above, $R_8'$ is a 4-tertbutylphenyl group, —CH$_2$—CH=CH$_2$, or one of the groups represented by the following Formulae 65A:
Formula 65A
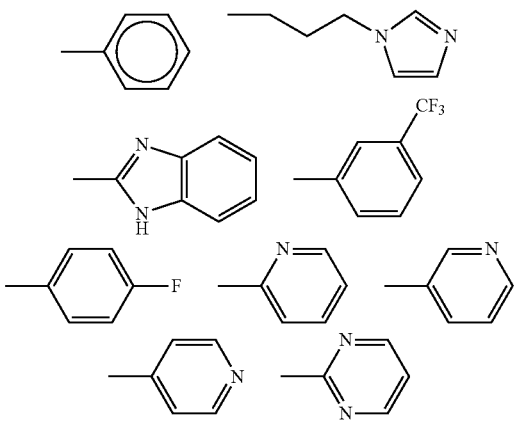
For example, the compound of Formula 6 may be selected from the compounds represented by Formulae 66 to 69 below:
[Formula 66]
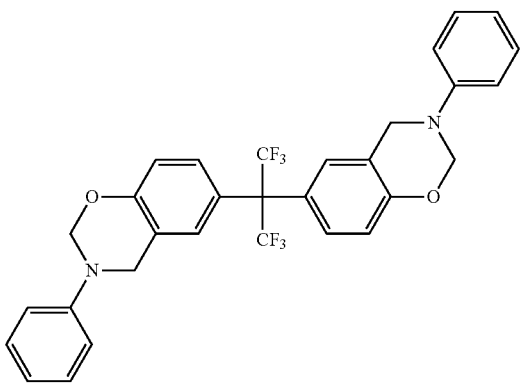
[Formula 67]
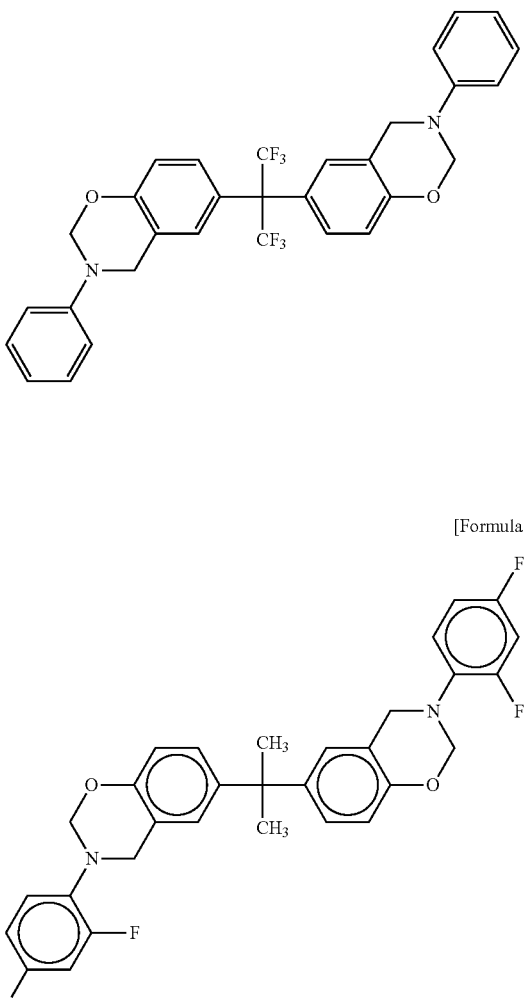
[Formula 68]
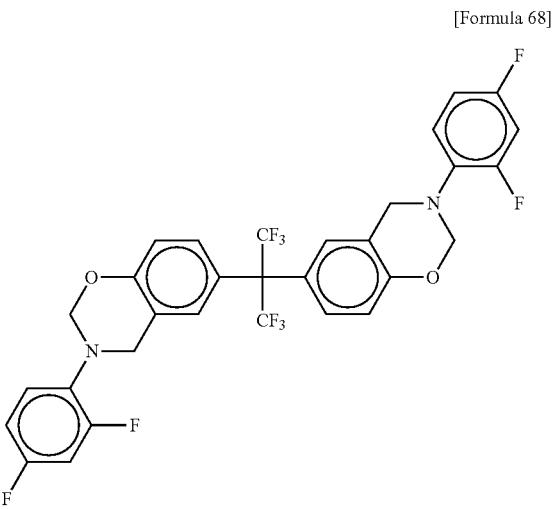

[Formula 69]

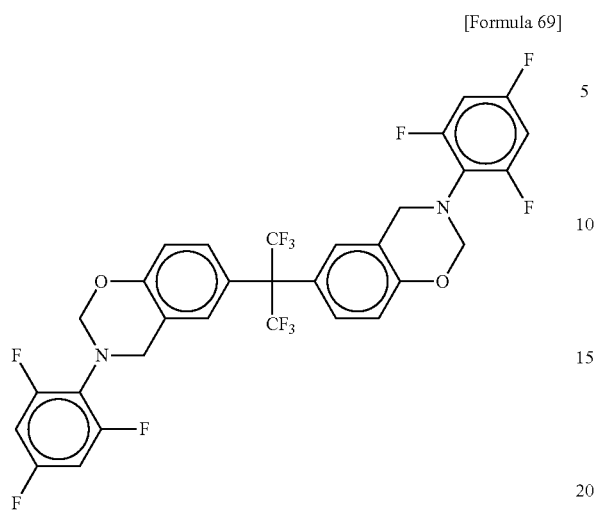

Examples of the compound of Formula 7 include compounds represented by Formulae 70 to 73 below:

Formula 70

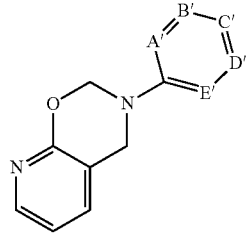

In Formula 70, R''' is a hydrogen atom or a $C_1$-$C_{10}$ alkyl group.

[Formula 71]

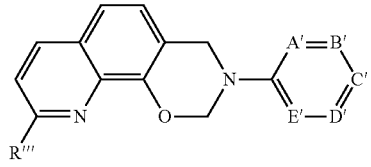

[Formula 72]

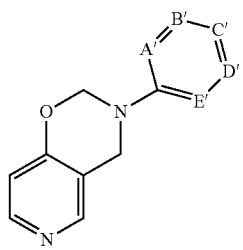

[Formula 73]

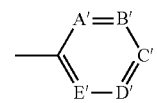

In Formulae 70 to 73 above,

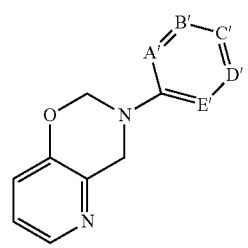

is selected from the groups represented by the following Formula 74.

Formula 74

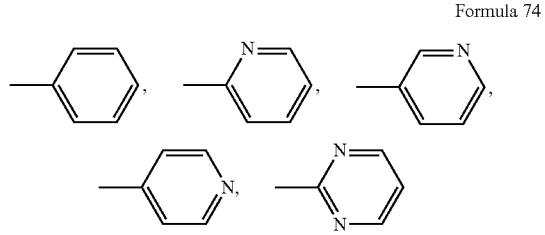

Examples of the compound of Formula 7 may include compounds represented by Formulae 75 to 95.

[Formula 75]

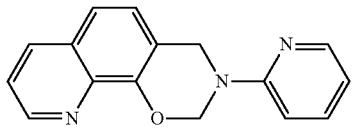

[Formula 76]

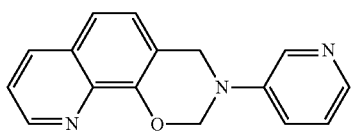

[Formula 77]

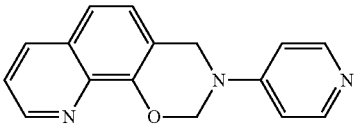

[Formula 78]

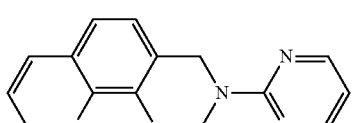

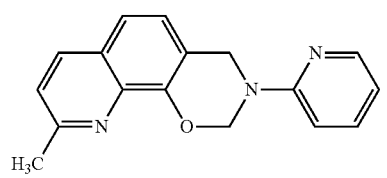
[Formula 79]
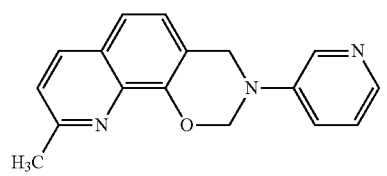
[Formula 80]
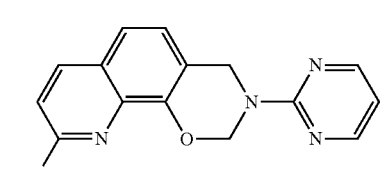
[Formula 81]
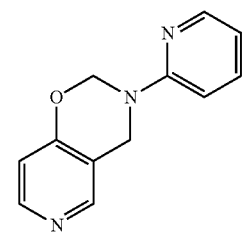
[Formula 82]
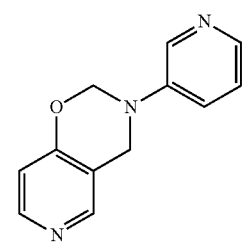
[Formula 83]
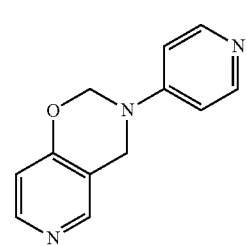
[Formula 84]
[Formula 85]
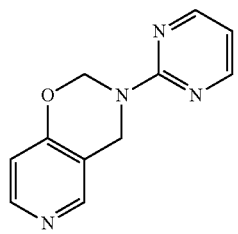
[Formula 86]
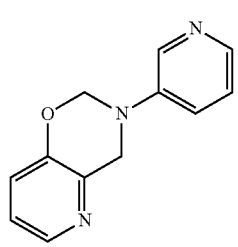
[Formula 87]
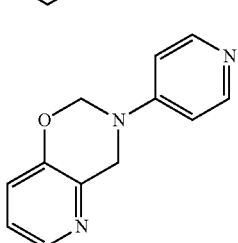
[Formula 88]
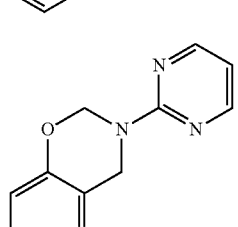
[Formula 89]
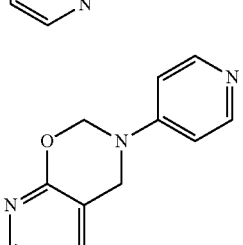
[Formula 90]
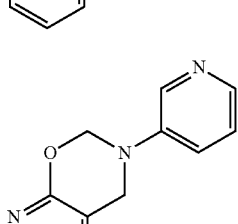
[Formula 91]
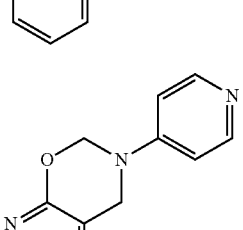
[Formula 92]

[Formula 93]

[Formula 94]

[Formula 95]

In Formula 8, A' may be selected from the groups represented by Formulae 96 and 97 below.

Formula 96

Formula 97

In Formulae 96 and 97, $R_k$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbocyclic group, a halogenated $C_4$-$C_{20}$ carbocyclic group, a $C_1$-$C_{20}$ heterocyclic group or a halogenated $C_1$-$C_{20}$ heterocyclic group.

Examples of the compound of Formula 8 that contain phosphorus include compounds represented by Formulae 98 or 99 below.

[Formula 98]

[Formula 99]

In Formulae 98 and 99, $R_k$ may be selected from the groups represented by Formula 99A below.

Formula 99A

The compound of Formula 8 may be selected from the compounds represented by Formulae 100 to 105:

[Formula 100]
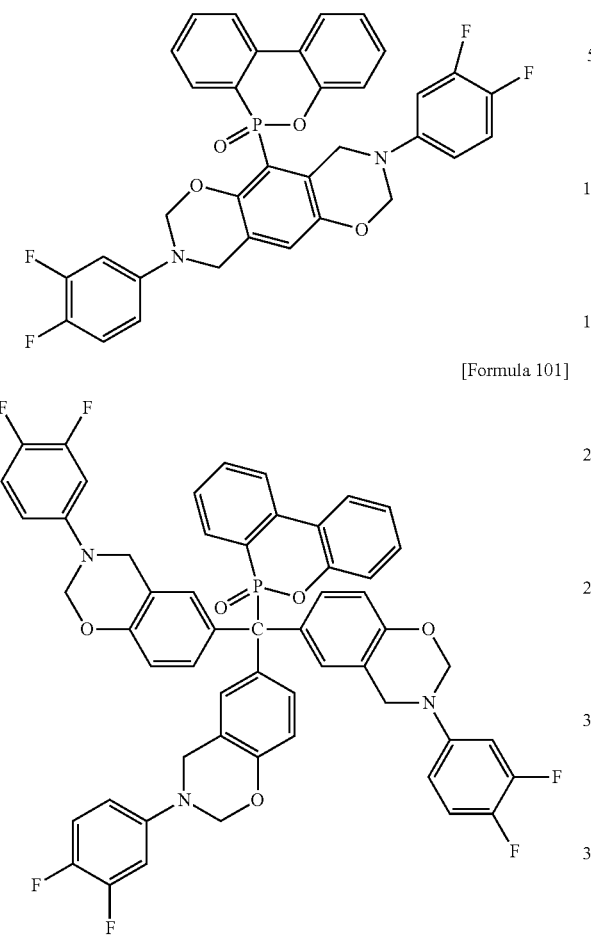
[Formula 101]
[Formula 102]
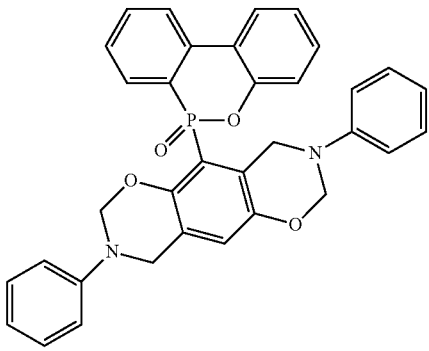
[Formula 103]
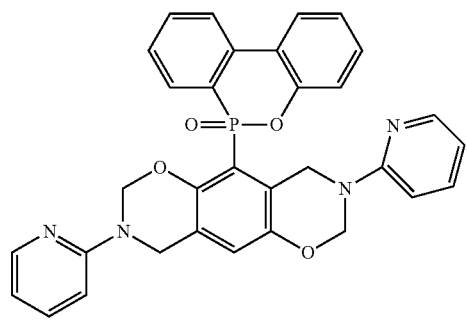
[Formula 104]
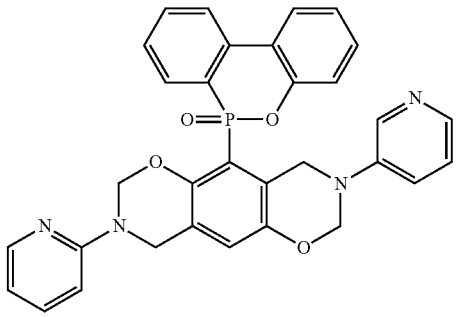
[Formula 105]
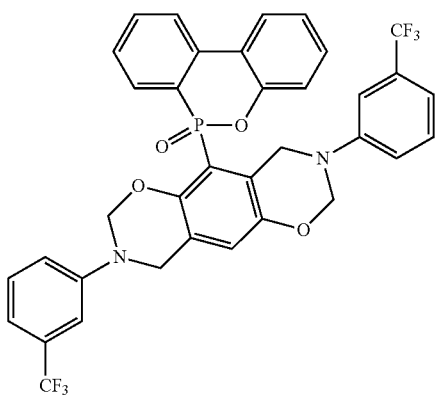
Examples of the compound of Formula 9 include compounds represented by Formulae 106, 107, and 109 below.
Formula 106
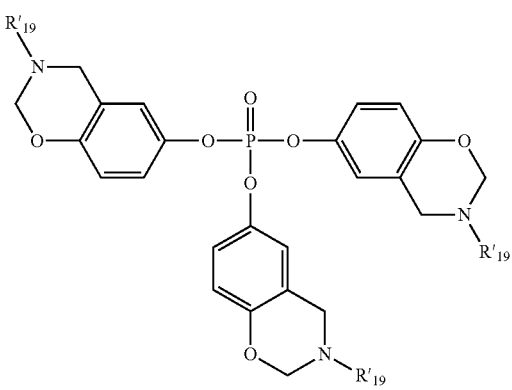
Formula 107
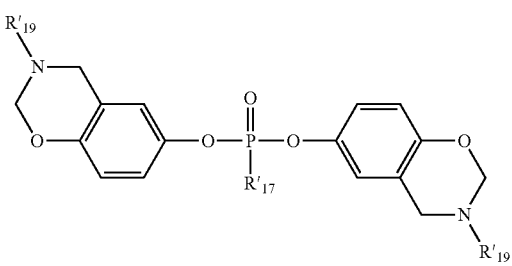

In Formulae 106 and 107, $R_{17}'$ is a $C_1$-$C_{10}$ alkyl group, a $C_1$-$C_{10}$ alkoxy group, a $C_6$-$C_{10}$ aryl group, or a $C_6$-$C_{10}$ aryloxy group; and $R_{19}'$ is selected from the groups represented by Formula 108:

Formula 108

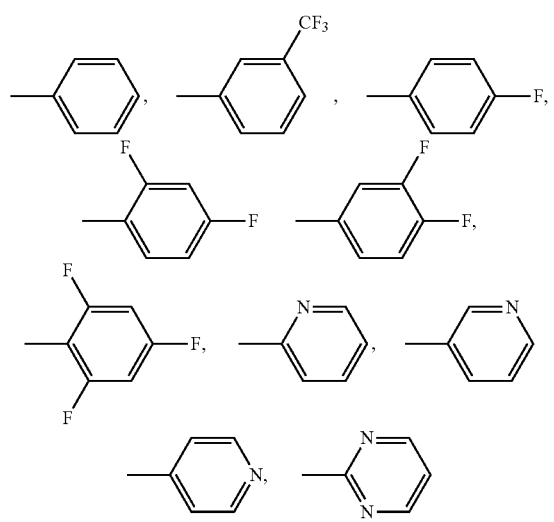

Formula 109

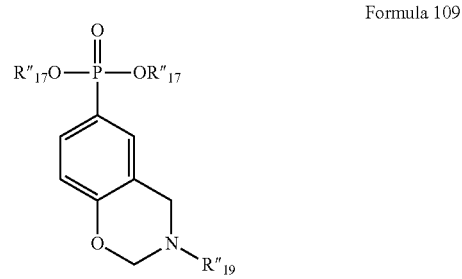

In Formula 109, $R_{17}'$ is a $C_6$-$C_{10}$ aryl group; and $R_{19}'$ is selected from the groups represented by Formula 110 below:

Formula 110

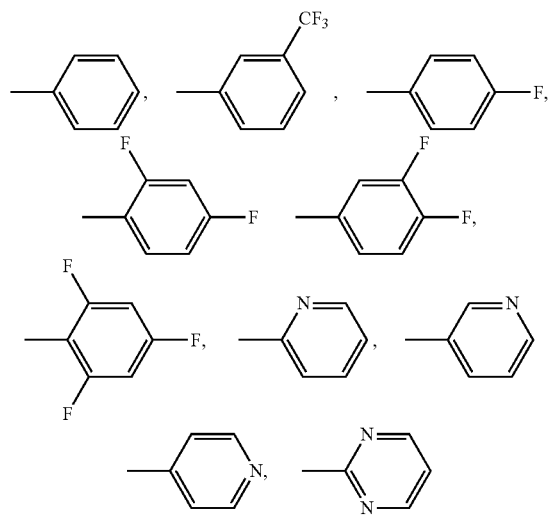

Examples of the compound of Formula 9 include compounds represented by Formulae 111 and 112 below:

Formula 111

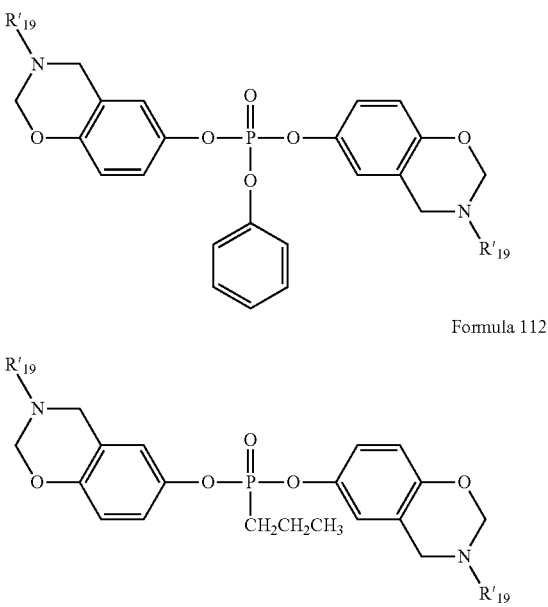

Formula 112

In Formulae 111 and 112, $R_{19}'$ is selected from the groups represented by Formula 111A.

Formula 111A

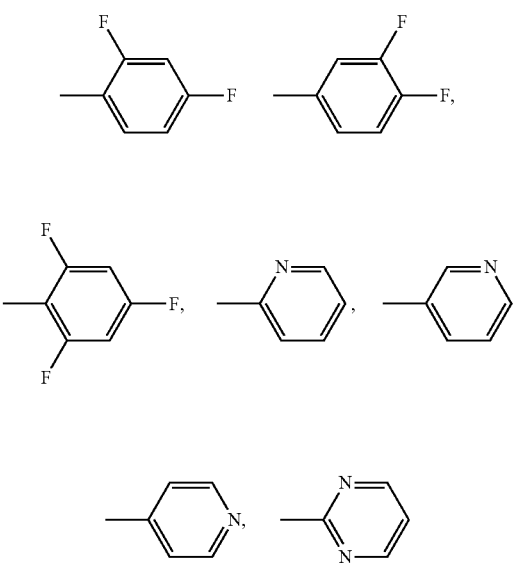

Examples of the compound of Formula 9 include compounds represented by Formulae 113 to 119.

[Formula 113]
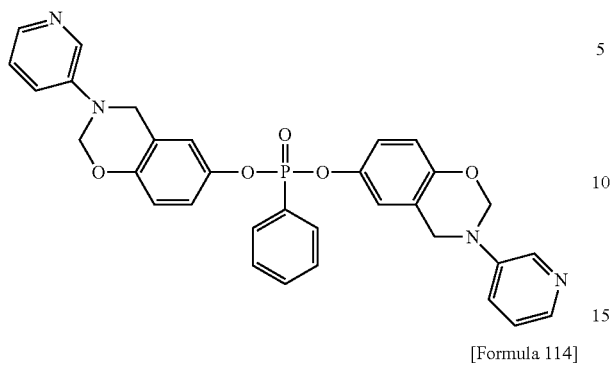
[Formula 114]
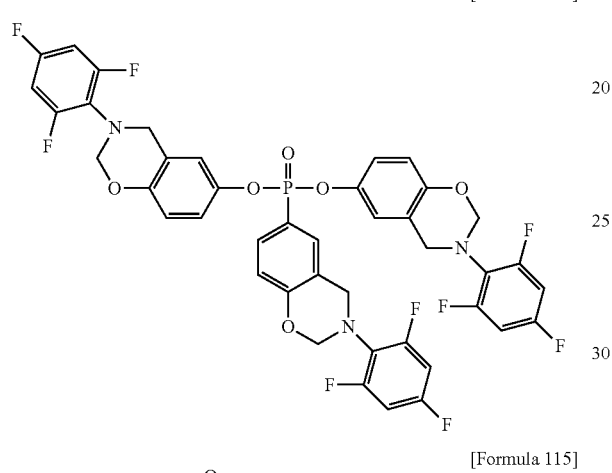
[Formula 115]
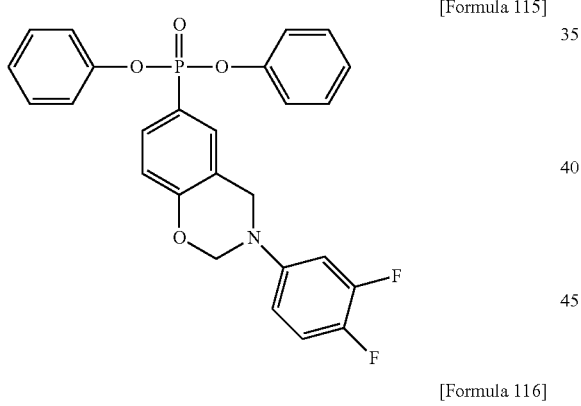
[Formula 116]
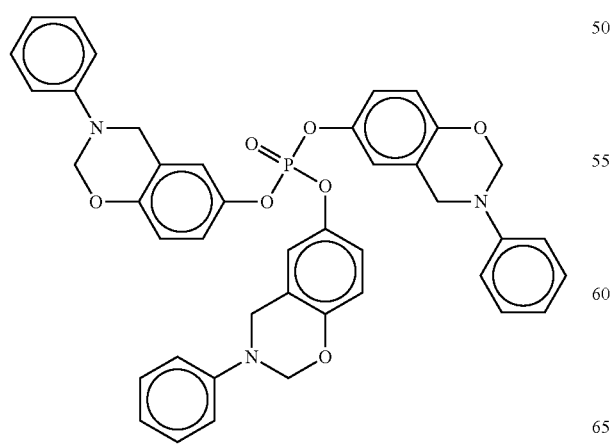
[Formula 117]
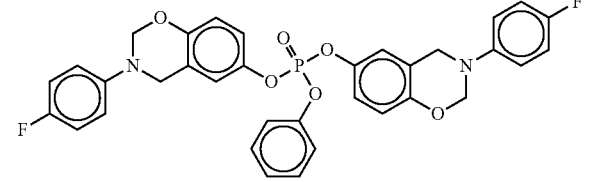
[Formula 118]
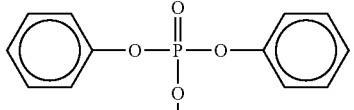
[Formula 119]
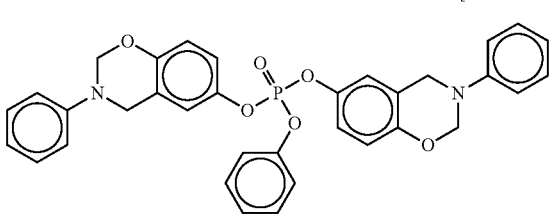
Examples of the compound of Formula 10 include compounds represented by Formulae 120 through 122.
Formula 120
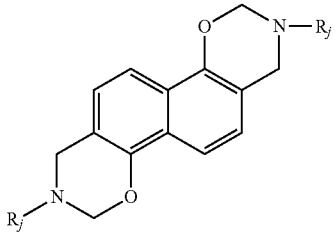
Formula 121
Formula 122
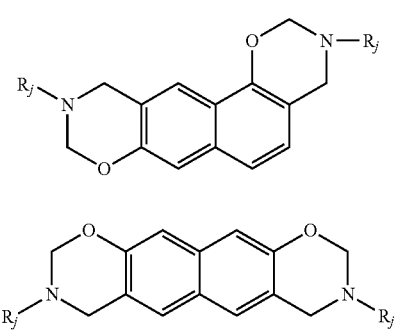
In Formulae 120 through 122, $R_j$ is selected from the groups represented by Formula 121A.

Formula 121A

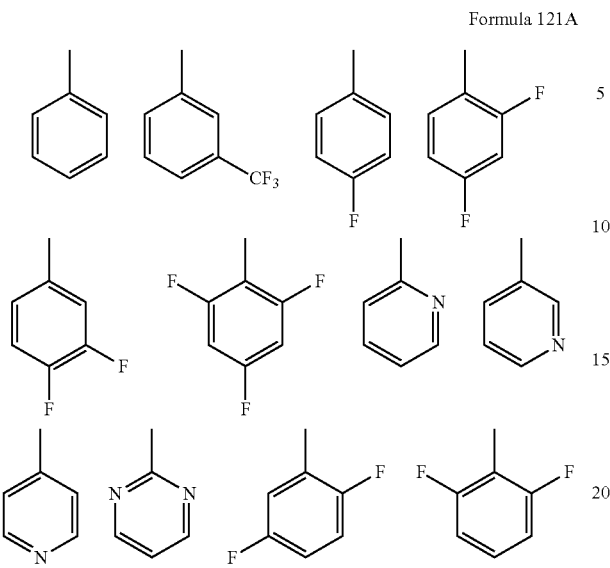

Examples of the compound of Formula 10 include compounds represented by Formulae 123 through 130.

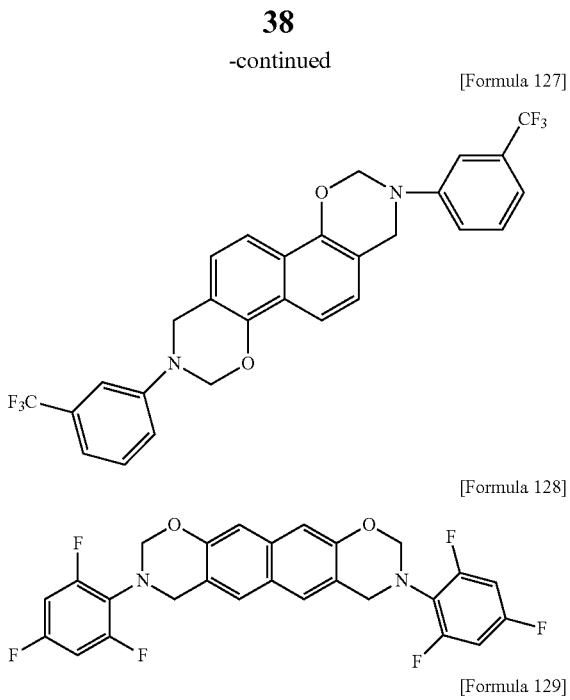

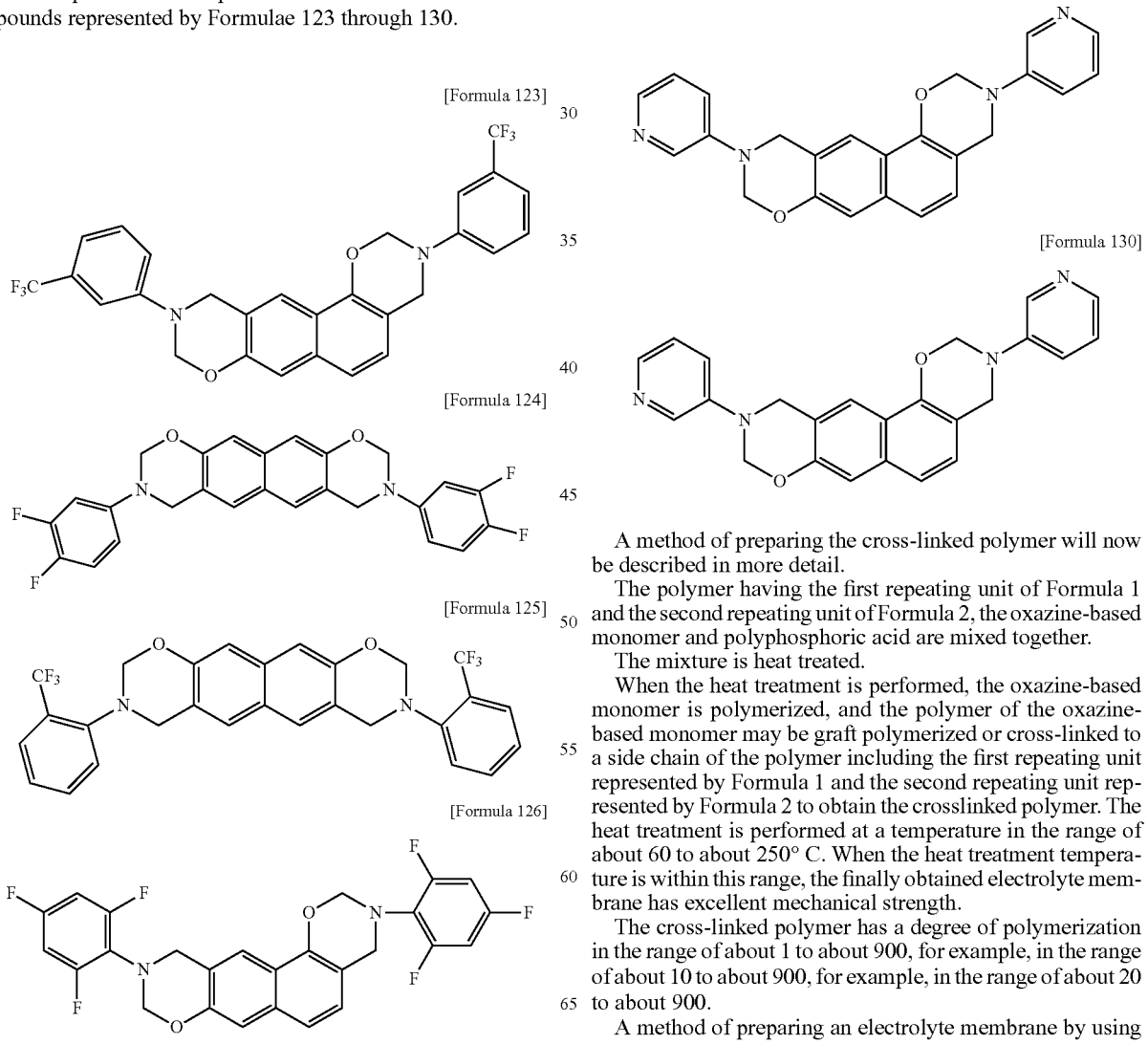

A method of preparing the cross-linked polymer will now be described in more detail.

The polymer having the first repeating unit of Formula 1 and the second repeating unit of Formula 2, the oxazine-based monomer and polyphosphoric acid are mixed together.

The mixture is heat treated.

When the heat treatment is performed, the oxazine-based monomer is polymerized, and the polymer of the oxazine-based monomer may be graft polymerized or cross-linked to a side chain of the polymer including the first repeating unit represented by Formula 1 and the second repeating unit represented by Formula 2 to obtain the crosslinked polymer. The heat treatment is performed at a temperature in the range of about 60 to about 250° C. When the heat treatment temperature is within this range, the finally obtained electrolyte membrane has excellent mechanical strength.

The cross-linked polymer has a degree of polymerization in the range of about 1 to about 900, for example, in the range of about 10 to about 900, for example, in the range of about 20 to about 900.

A method of preparing an electrolyte membrane by using the cross-linked polymer is as follows.

First, the polymer having the first repeating unit of Formula 1 and the second repeating unit of Formula 2, the oxazine-based monomer, and polyphosphoric acid are mixed together, and the mixture is stirred. The amount of the polyphosphoric acid is in the range of about 1000 to 4000 parts by weight based on 100 parts by weight of the polymer having the first repeating unit of Formula 1 and the second repeating unit of Formula 2.

The mixture is cast on a substrate, and the resultant product is heat treated.

The heat treatment is performed at a temperature in the range of about 100 to about 250° C.

The heat treated reaction mixture is impregnated with phosphoric acid at room temperature. As the phosphoric acid, either 85 weight % orthophosphoric acid or a diluted aqueous 5-30 wt % phosphoric acid solution is used.

The method may further include maintaining the heat treated reaction mixture under constant temperature and humidity conditions before it is impregnated with phosphoric acid. Under such constant temperature and humidity conditions, the polyphosphoric acid is hydrolyzed.

In these conditions, the temperature is adjusted to the range of about −20 to about 30° C., and a relative humidity (RH) is adjusted to the range of about 5 to about 50%.

For example, the temperature is in the range of about −10 to about 15° C., and the RH is in the range of about 5 to about 25%. For another example, the polyphosphoric acid may be slowly hydrolyzed at a temperature of −10° C. and a RH of 25% for 48 hours or more.

When the temperature is in the above range, it may be easy to adjust the speed of the hydrolysis without reduction in the hydrolysis reactivity. When the RH is within this range, the finally obtained electrolyte membrane has excellent physical properties without reduction in the hydrolysis reactivity.

The resultant product obtained according to the processes described above is dried in vacuum at room temperature (about 20° C.), an electrolyte membrane for a fuel cell including the cross-linked polymer may be obtained.

The electrolyte membrane may be prepared using a sol-gel method using the polyphosphoric acid described above, or may be prepared using the same method as the method of preparing an electrolyte membrane disclosed in Korean Patent Publication No. 2009-0045655 filed by the same applicant.

An electrode for a fuel cell may include the cross-linked polymer and a catalyst. In this composition of the electrode, oxygen permeation can be improved, and wettability of phosphoric acid ($H_3PO_4$) and thermal stability may be improved in the electrode even when air is used in a cathode. Thus, a fuel cell, including the electrode and the electrolyte membrane, may operate in high-temperature and non-humidified conditions, and may provide enhanced thermal stability and power generation.

The catalyst may be platinum (Pt), or an alloy or a mixture of platinum (Pt) and at least one metal selected from the group consisting of gold (Au), palladium (Pd), rhodium (Ru), iridium (Ir), ruthenium (Ru), tin (Sn), molybdenum (Mo), cobalt (Co), and chromium (Cr). For example, the Pt, the alloy, or the mixture may be supported on a carbonaceous support. For another example, the catalyst may be at least one metal selected from the group consisting of Pt, a PtCo alloy, and a PtRu alloy. Such a metal or alloy may be supported on a carbonaceous support.

The electrode may further include a binder commonly used in the manufacture of an electrode for a fuel cell.

The binder may be at least one selected from the group consisting of poly(vinylidenefluoride), polytetrafluoroethylene, a tetrafluoroethylene-hexafluoropropylene copolymer, and perfluoroethylene, and the amount of the binder may be in the range of about 0.001 to about 0.5 parts by weight based on 1 part by weight of the catalyst.

When the amount of the binder is within this range, the wettability of the electrode may be effectively enhanced.

The electrode for a fuel cell may be manufactured using a method of using polyphosphoric acid, which will be described later, or may be manufactured using the same method as the method of manufacturing an electrode disclosed in Korean Patent Publication No. 2009-0045655 filed by the same applicant.

First, a catalyst is dispersed in a solvent to obtain a dispersion solution. The solvent may be N-methylpyrrolidone (NMP), dimethylformamide (DMAc), or the like. The amount of the solvent may be in the range of about 1 part to about 10 parts by weight based on 1 part by weight of the catalyst.

A mixture of the polymer having the first repeating unit of Formula 1 and the second repeating unit of Formula 2, the oxazine-based monomer, a binder, a solvent, and polyphosphoric acid is added to the dispersion solution and mixed together, and the resultant mixture is stirred.

The solvent may be N-methylpyrrolidone (NMP), dimethylacetamide (DMAc), or the like.

The mixture may further include any one of conventional binders that are used in manufacturing a fuel cell.

The amount of the polyphosphoric acid is in the range of about 1 to about 10 parts by weight based on 100 parts by weight of the polymer having the first repeating unit of Formula 1 and the second repeating unit of Formula 2.

The resultant mixture is coated on the surface of a carbon support, to complete the manufacture of the electrode. In this regard, the carbon support may be fixed on a glass substrate to facilitate the coating. A method of coating the coating solution is not particularly limited. Examples of the coating method include coating using a doctor blade, bar coating, and screen printing.

The coated resultant is dried at a temperature in the range of about 20 to about 150° C. to remove the solvent. The drying time may vary according to the drying temperature, and may be in the range of about 10 to about 60 minutes.

The catalyst layer of the electrode may further include at least one proton conductor selected from a phosphoric acid and a $C_1$-$C_{20}$ organic phosphonic acid. The amount of the proton conductor may be in the range of about 10 parts to about 1,000 parts by weight based on 100 parts by weight of the total weight of the electrode.

The concentration of the acid is not particularly limited. However, when using a phosphoric acid, an aqueous 80 wt % phosphoric acid solution may be used. The impregnation time of the phosphoric acid may be from about 2.5 to about 14 hours at about 80° C.

When the electrolyte membrane and the electrode are manufactured, phosphoric acid is used to prepare the polymer of the oxazine-based monomer, and secondary impregnation process of phosphoric acid may also be performed. The phosphoric acid used may be an aqueous 5 to 30 wt % phosphoric acid solution.

Meanwhile, performance of the fuel cell may be maximized by optimizing materials used to form the electrolyte membrane and/or materials used to form the electrode.

Alternatively, the electrolyte membrane for a fuel cell and the electrode for a fuel cell may be prepared using a polymer composition obtained by mixing the polymer and the oxazine-based monomer.

A method of manufacturing a fuel cell including the electrode for a fuel cell will now be described.

An electrolyte membrane may be an electrolyte membrane that is commonly used in a fuel cell, or an electrolyte membrane including the cross-linked product of the oxazine-based monomer and the polymer having the first repeating unit of Formula 1 and the second repeating unit of Formula 2.

For example, when the electrolyte membrane is prepared using the polymer described above, the contact resistance between the electrolyte membrane and any one of the electrodes decreases, thereby maximizing performance of the fuel cell.

For example, the electrolyte membrane that is commonly used in the fuel cell may be a polybenzimidazole electrolyte membrane, a polybenzoxazine-polybenzimidazole copolymer electrolyte membrane, a porous polytetrafluoroethylene (PTFE) membrane, or the like.

A method of manufacturing a membrane and electrode assembly (MEA) for a fuel cell will now be described in detail. The term "membrane-electrode assembly (MEA)" refers to a structure in which an electrolyte membrane is disposed between two electrodes, each electrode including a catalyst layer and a diffusion layer.

In order to manufacture an MEA, electrodes having catalyst layers as described above are respectively disposed on both surfaces of an electrolyte membrane obtained as described above, and incubated under high temperature and high pressure conditions. The electrodes are thereby adhered to both surfaces of the electrolyte membrane, and fuel diffusion layers are then adhered to the electrodes.

The adhesion may be performed under a pressure of about 0.1 to about 3 ton/cm$^2$, or about 1 ton/cm$^2$, at a temperature at which the electrolyte membrane is softened.

Next, bipolar plates are respectively installed on both sides of the MEA, to complete the fuel cell. The bipolar plates may have grooves for supplying fuel and may function as current collectors.

The fuel cell may be used as a polymer electrolyte membrane fuel cell (PEMFC), but is not limited thereto.

Substituents in the formulae above may be defined as follows.

As used herein, the term "alkyl" refers to a fully saturated branched or unbranched (or straight chain or linear) hydrocarbon moiety.

Examples of the alkyl group used herein include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$ and $CCl_3$), a $C_1$-$C_{20}$ alkoxy, a $C_2$-$C_{20}$ alkoxyalkyl, a hydroxy group, a nitro group, a cyano group, an amino group, an amidino group, a hydrazine, a hydrazone, a carboxyl group or a salt thereof, a sulfonyl group, a sulfamoyl, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

As used herein, the term "halogen atom" refers to fluoro, bromo, chloro, or iodo.

As used herein, the term "a $C_1$-$C_{20}$ alkyl group substituted with a halogen atom" refers to a $C_1$-$C_{20}$ alkyl group that is substituted with one or more halo groups, and unlimited examples of a $C_1$-$C_{20}$ alkyl group that is substituted with one or more halo groups are monohaloalkyl, dihaloalkyl, and polyhaloalkyl including perhaloalkyl.

A monohaloalkyl has one iodo, bromo, chloro or fluoro within the alkyl group, and dihaloalkyl and polyhaloalkyl groups have two or more of the same halo atoms or a combination of different halo groups within the alkyl.

As used herein, the term "alkoxy" refers to alkyl-O—, wherein alkyl is defined herein above. Examples of alkoxy include, but are not limited to, methoxy, ethoxy, propoxy, 2-propoxy, butoxy, tert-butoxy, pentyloxy, hexyloxy, cyclopropyloxy-, cyclohexyloxy- and the like. At least one hydrogen atom of the alkoxy group may be substituted with the same substituent as described above in connection with the alkyl group.

The term alkoxyalkyl refers to an alkyl group, as defined above, in which the alkyl group is substituted with an alkoxy group. At least one hydrogen atom of the alkoxyalkyl group may be substituted with the same substituent as described above in connection with the alkyl group. The term alkoxyalkyl includes a substituted alkoxyalkyl moiety.

The term "alkenyl" refers to a branched or unbranched hydrocarbon having at least one carbon-carbon double bond. Examples of alkenyl are, but are not limited to, vinyl, allyl, butenyl, isopropenyl or isobutenyl. At least one hydrogen atom of the alkenyl group may be substituted with the same substituent as described above in connection with the alkyl group.

The term "alkynyl" refers to a branched or unbranched hydrocarbon having at least one carbon-carbon triple bond. Examples of alkynyl are, but are not limited to, ethynyl, butynyl, isobutynyl or isopropynyl.

At least one hydrogen atom of alkynyl may be substituted with the same substituent as described above in connection with the alkyl group.

The term "aryl" is used alone or in combination, and refers to an aromatic hydrocarbon group having one or more rings.

The term "aryl" also refers to a group in which an aromatic ring is fused to one or more cycloalkyl rings.

Examples of an aryl group are, but are not limited to, phenyl, naphthyl, or tetrahydronaphthyl.

At least one hydrogen atom of the aryl group may be substituted with the same substituent as described above in connection with the alkyl group.

The term "arylalkyl" is an alkyl group substituted with an aryl group. Examples of an arylalkyl group are benzyl or phenyl-$CH_2CH_2$—.

The term "aryloxy" includes an —O-aryl group, wherein aryl is defined herein. Examples of an aryloxy group are a phenoxy group and the like. At least one hydrogen atom of the aryloxy group may be substituted with the same substituent as described above in connection with the alkyl group.

The term "heteroaryl" refers to a monocyclic or bicyclic organic compound that contains one or more hetero atoms selected from N, O, P, and S, and the remaining ring atoms are carton atoms. The heteroaryl group may include, for example, 1 to 5 hetero atoms, and 5 to 10 ring members.

S or N may be oxidized to various oxidation states.

Typical monocyclic heteroaryl groups include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2yl, pyrazin-4-yl, pyrazin-5-yl, 2-pyrimidin-2-yl, 4-pyrimidin-2-yl, and 5-pyrimidin-2-yl.

The term "heteroaryl" also refer to a group in which a heteroaromatic ring is fused to one or more aryl, cycloaliphatic, or heterocyclic rings Examples of bicyclic heteroaryl are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoquinolinyl, thieno[2,3-b]furanyl, furo[3,2-b]-pyranyl, 5H-pyrido[2,3-d]o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom in the heteroaryl group may be substituted with the same substituent as described above in connection with the alkyl group.

The term "heteroarylakyl" refers to an alkyl group substituted with a heteroaryl group.

The term "heteroaryloxy" includes an —O-heteroaryl moiety. At least one hydrogen atom in a heteroaryloxy group may be substituted with the same substituent as described above in connection with the alkyl group.

The term "heteraryloxyalkyl" refers to an alkyl group that is substituted with a heteroaryloxy group. At least one hydrogen atom in heteraryloxyalkyl may be substituted with the same substituent as described above in connection with the alkyl group.

As used herein, the term "carbocyclic" refers to saturated or partially unsaturated but non-aromatic monocyclic, bicyclic or tricyclic hydrocarbon groups.

Exemplary monocyclic hydrocarbon groups include cyclopentyl, cyclopentenyl, cyclohexyl and cyclohexenyl.

Exemplary bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl.

Exemplary tricyclic hydrocarbon groups include adamantyl.

At least one hydrogen atom in a carbocyclic group may be substituted with the same substituent as described above in connection with the alkyl group.

The term "heterocyclic" refers to a ring containing 5-10 ring atoms including a hetero atom such as N, S, P, or O, and an example of a heterocyclic group is pyridyl. At least one hydrogen atom in a heterocyclic group may be substituted with the same substituent as described above in connection with the alkyl group.

The term "heterocyclicoxy" includes an —O-heterocyclyl group, and at least one hydrogen atom in a heterocyclicoxy group may be substituted with the same substituent as described above in connection with the alkyl group.

The term "sulfonyl" includes R"—SO$_2$—, wherein R" is hydrogen, alkyl, aryl, heteroaryl, aryl-alkyl, heteroaryl-alkyl, alkoxy, aryloxy, cycloalkyl, or heterocyclyl.

The term "sulfamoyl" includes $H_2NS(O)_2$—, alkyl-NHS$(O)_2$—, (alkyl)$_2$NS(O)$_2$—, aryl-NHS(O)$_2$—, alkyl(aryl)-NS(O)$_2$—, (aryl)$_2$NS(O)$_2$—, heteroaryl-NHS(O)$_2$—, (aryl-alkyl)-NHS(O)$_2$—, or (heteroaryl-alkyl)-NHS(O)$_2$—.

At least one hydrogen atom in sulfamoyl may be substituted with the same substituent as described above in connection with the alkyl group.

The term "amino" includes compounds where a nitrogen atom is covalently bonded to at least one carbon or heteroatom. The term "amino" also includes —NH$_2$ and also includes substituted moieties.

The term also includes "alkyl amino" wherein the nitrogen is bound to at least one additional alkyl group. The term also includes "arylamino" and "diarylamino" groups wherein the nitrogen is bound to at least one or two independently selected aryl groups, respectively.

The term "alkylene", "alkenylene", "alkynylene", "arylene", and "heteroarylene" are defined as described above, except that "alkyl", "alkenyl", "alkynyl", "aryl", and "heteroaryl" groups, which are mono-valent groups, are changed into divalent groups.

At least one hydrogen atom in "alkylene", "alkenylene", "alkynylene", "arylene", and "heteroarylene" may be substituted with the same substituent as described above in connection with the alkyl group.

Hereinafter, one or more embodiments of the present invention will be described in detail with reference to the following examples. These examples are not intended to limit the purpose and scope of the one or more embodiments of the present invention.

Example 1

Synthesis of Cross-Linked Polymer and Preparation of Electrolyte Membrane Using the Same First, a polymer of Formula 11 was prepared according to Reaction Scheme 2 below.

0.0186 mole of diaminobenzenedithiol, 0.0186 mole of terephthalic acid, and 0.0434 mole of 3,4-diaminobenzoic acid were dissolved in 307 g of polyphosphoric acid at a temperature of 60 to 150° C., and the mixture was heat treated at a temperature of 150 to 250° C. for 12 hours to synthesize the polymer of Formula 11.

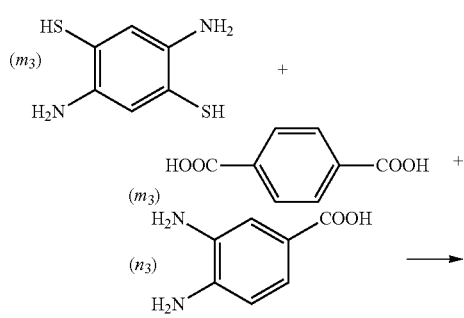

-continued

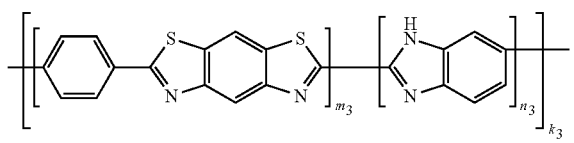

In Formula 11, $m_3$ is about 2, and $n_3$ is about 8, and $k_3$ is about 10 to about 250.

When polymerization was completed, the reaction mixture became a solution having a high viscosity, and o-phosphoric acid was added to the solution at 150° C. and dissolved therein. The polymer obtained according to the polymerization had a number average molecular weight of about 150,000. The number average molecular weight was measured by gel permeation chromatography.

65 parts by weight of 4FPh2AP represented by the following formula as an oxazine-based monomer was added to the mixture and the resultant mixture was stirred. The amount of the polymer of Formula 11 reacted with the compound of Formula 2 was 35 parts by weight.

[Formula 21]

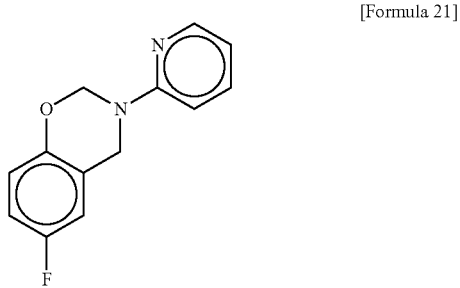

The stirred resultant product was cast on a quartz plate, and the resulting quartz plate was put in an oven at 100° C. in a nitrogen atmosphere and cured.

The temperature of the resultant product was slowly increased from 100° C. to 220° C. for about 3 hours, was fixed at 220° C. for 1 hour, and was then slowly cooled in the oven.

The reaction resultant was slowly hydrolyzed at −10° C. in a relative humidity ($R^H$) of 25% for 48 hours or more.

The prepared film was immersed in about 20 wt % of an aqueous phosphoric acid solution at room temperature for 24 hours to perform a secondary hydrolysis process. Subsequently, the film was taken out of the aqueous phosphoric acid solution, the phosphoric acid on the surface of the film was wiped off, and the film was dried in a vacuum oven for 24 hours or more to obtain an electrolyte membrane formed of the cross-linked polymer.

FIG. 1 illustrates an IR spectrum of the cross-linked polymer.

Properties of an electrolyte membrane formed of the cross-linked polymer prepared according to Example 1 are shown in Table 1 below. The properties shown in Table 1 were duplicate runs measured using UTM (model name: universal testing machine (Lloyd LR-10K), and samples were manufactured by using ASTM standard D638 (Type V specimens) and evaluated.

TABLE 1

| | Phosphoric acid content * (weight %) | Modulus (MPa) | Tensile Strength (MPa) | Stress at break (MPa) | Strain |
|---|---|---|---|---|---|
| Example 1 | 65.4 | 91.3 | 3.50 | 2.83 | 16.2 |
| | 72.8 | 45.2 | 3.22 | 3.04 | 28.8 |

Example 2

Synthesis of Cross-Linked Polymer and Preparation of Electrolyte Membrane Using the Same 0.0187 mole of diaminobenzenedithiol and 0.0187 mole of terephthalic acid were dissolved in 82 g of polyphosphoric acid at a temperature of 60 to 150° C., and the mixture was heat treated at a temperature of 150 to 250° C. for 12 hours to synthesize the polymer of Formula 11 where n=0.

A cross-linked polymer was synthesized in the same manner as in Example 1, except that in the compound like Formula 11 of Example 1 $m_3$ is about 2, and $n_3$ is 0 instead of the compound of Formula 11 or Example 1 (where $m_3$ is about 2, and $n_3$ is about 8), and an electrolyte membrane was prepared using the cross-linked polymer.

Comparative Example 1

Preparation of Electrolyte Membrane Using Poly(2,5-benzimidazole) (ABPBI)

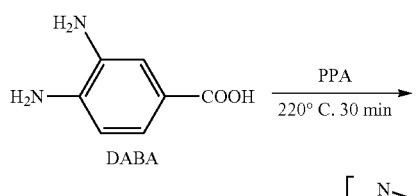

DABA 3,4-diaminobenzoic acid (DABA) was completely dissolved in a polyphosphoric acid (PPA) solvent at 150° C. The mixture was stirred to prepare a homogeneous solution, and the homogeneous solution was polymerized at 220° C. for 30 minutes to obtain ABPBI.

Subsequently, the ABPBI was impregnated with 85 wt % of phosphoric acid at 80° C. for 4 hours or longer to form an electrolyte membrane. In this regard, the amount of phosphoric acid was about 530 parts by weight, based on 100 parts by weight of the electrolyte membrane.

Manufacture Example 1

Manufacture of Fuel Cell Using Electrolyte Membrane of Example 1

1 g of a catalyst including 50 wt % of Pt/Co loaded on carbon, and 3 g of N-methylpyrrolidone (NMP) as a solvent were added to a stirring vessel, and the mixture was stirred to prepare a slurry. Subsequently, a solution of 5 wt % of polyvinylidene fluoride in NMP was added to the mixture until the mixture contained 0.025 g of polyvinylidene fluoride. The resultant was mixed for 10 minutes to prepare a slurry for a cathode catalyst layer.

Carbon paper was cut to a size of 4×7 cm², fixed on a glass plate, and coated thereon by using a doctor blade (Sheen Instruments Ltd) having a gap of 600 μm.

The slurry for the cathode catalyst layer was coated on the carbon paper, and dried at room temperature for one hour, at 80° C. for one hour, at 120° C. for 30 minutes, and at 150° C. for 15 minutes to form cathodes (fuel electrodes). The amount of loaded Pt/Co in the prepared cathode was 3.0 mg/cm².

Anodes were manufactured as follows.

2 g of a Pt catalyst (50 wt % of Pt supported on carbon) and 9 g of N-methylpyrrolidone (NMP) as a solvent were put into a stirring vessel, and stirred using a high-speed stirrer for two minutes.

Subsequently, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer, using a bar coater, to complete the manufacture of the anode. The loading amount of platinum in the anodes was 1.4 mg/cm².

The amount of loaded Pt/Co in the prepared cathode was about 2.33 mg/cm², and the amount of loaded Pt in the prepared anode was 1.4 mg/cm².

The electrolyte membrane of Example 1 was disposed between the cathode and the anode to manufacture an MEA. The cathode and the anode were not impregnated with phosphoric acid. To prevent gas permeation between the cathode and the anode, a PTFE membrane main-gasket having a thickness of 200 μm and a PTFE membrane sub-gasket having a thickness of 20 μm were joined and disposed between each of the anode and cathode and the electrolyte membrane. The pressure applied to the MEAs was adjusted using a torque wrench, and was stepwise increased using 1, 2, and 3 N-m Torque wrenches.

Electricity was generated by supplying hydrogen to the anode (flow rate: 100 ccm) and air to the cathode (flow rate: 250 ccm), at 150° C., without humidifying the electrolyte membrane, and characteristics of the fuel cell were measured. In this regard, an electrolyte doped with phosphoric acid was used, and thus, the performance of the fuel cell was improved over time. Thus, aging was performed until an operating voltage reached a peak voltage, and finally, the characteristics of the fuel cell were evaluated. In addition, the surface areas of the cathode and the anode were fixed to 2.8×2.8 (7.84 cm²). The thickness of the cathode was about 430 μm, and the thickness of the anode was about 390 μm.

Manufacture Example 2

Manufacture of Fuel Cell Using Electrolyte Membrane of Example 2

A unit fuel cell was produced according to the same method as in Manufacture Example 1, except that the polymer electrolyte membrane of Example 2 was used instead of the polymer electrolyte membrane of Example 1.

Comparative Manufacture Example 1

Manufacture of Fuel Cell Using ABPBI Electrolyte Membrane

A fuel cell was manufactured in the same manner as in Example 1, except that the ABPBI electrolyte membrane of Comparative Example 1 was used instead of the electrolyte membrane of Example 1.

Variation in proton conductivity according to temperature of the fuel cells manufactured according to Manufacture Example 1 and Comparative Manufacture Example 1 were evaluated. In this regard, the proton conductivity was evaluated by the following method.

First, the ABPBI electrolyte membrane of Comparative Example 1 was heated in a stainless steel container until the temperature reached 180° C., and stabilized for 30 minutes. Subsequently, the temperature was adjusted to 80° C., and the proton conductivity of the electrolyte membrane was then evaluated using a 4-probe electrode while the temperature was scanned. The resistance of the electrolyte membrane was measured while a voltage bias of 10 mV (vs. O.C.V.) was applied thereto at a frequency in the range of 1 Hz to 1 MHz, and a platinum electrode was used as an electrode to evaluate reproducibility. Variation in proton conductivity according to time at a high temperature of the electrolyte membrane was measured to evaluate high temperature stability of the electrolyte membrane, and was measured under conditions that maintain a relative humidity at 0% by using deionized water and dry nitrogen every temperature.

Figure 2:
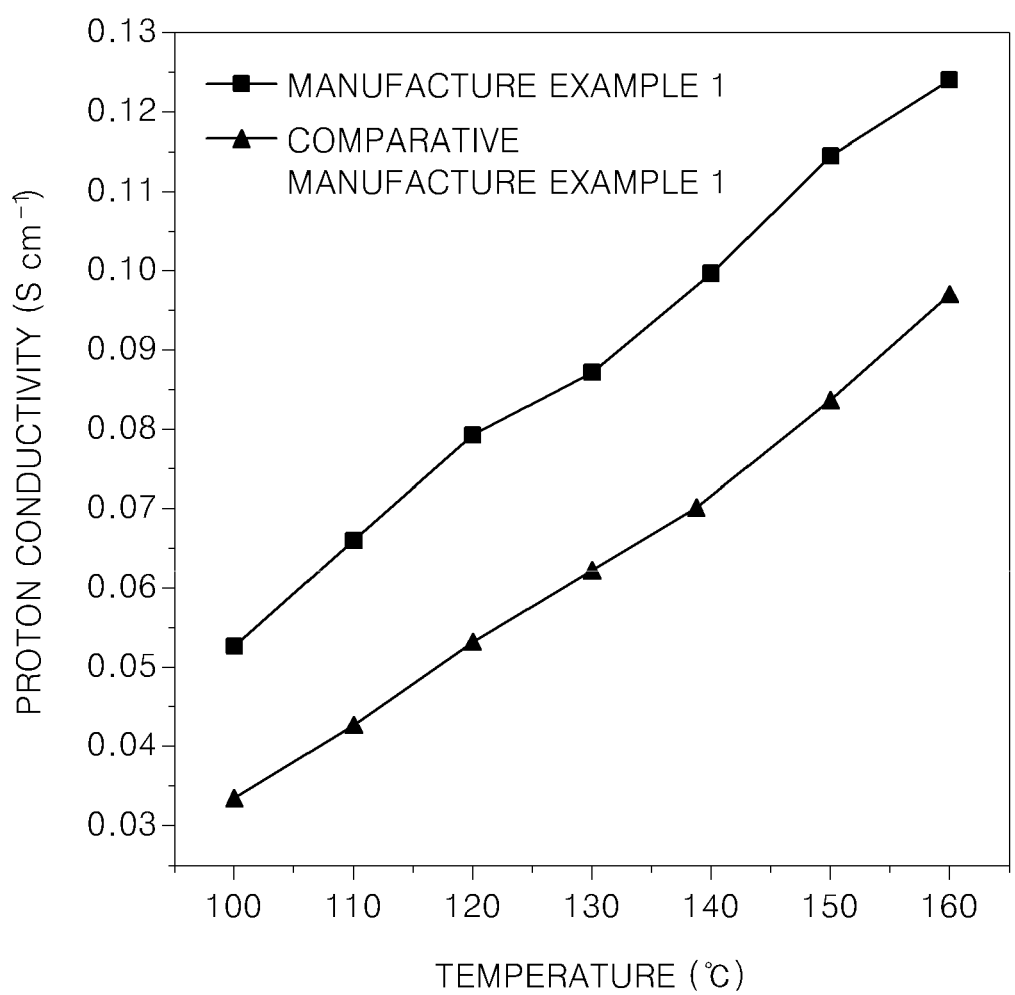
FIG. 2 is a graph showing variation in conductivity with respect to temperature of fuel cells manufactured according to Manufacture Example 1 and Comparative Manufacture Example 1.

The evaluation results of the proton conductivity are shown in FIG. 2.

Referring to FIG. 2, it is confirmed that the fuel cell of Manufacture Example 1 has higher proton conductivity than that of the fuel cell of Comparative Manufacture Example 1.

Voltage characteristics of the fuel cell manufactured according to Manufacture Example 1 with respect to current density were measured. The results are shown in FIG. 3.

Figure 3:
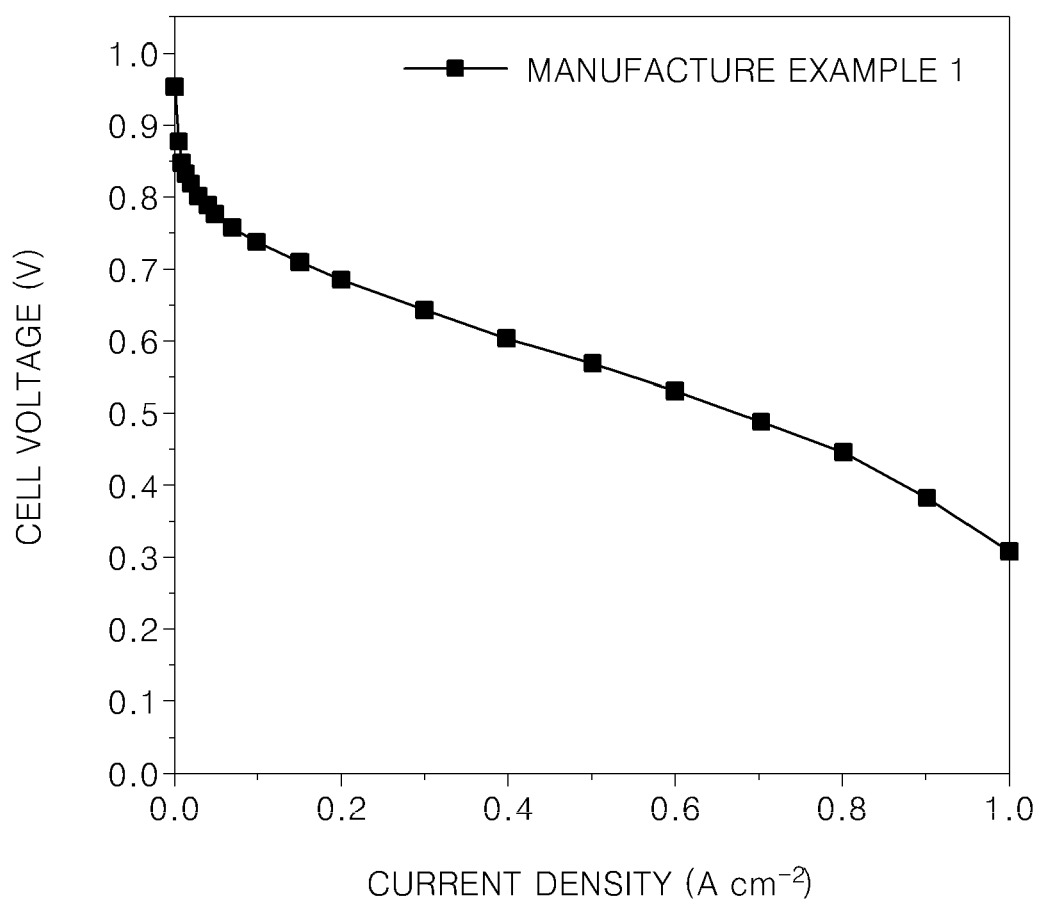
FIG. 3 is a graph showing variation in voltage with respect to current density of a fuel cell manufactured according to Manufacture Example 1.

Referring to FIG. 3, the fuel cell of Manufacture Example 1 has excellent voltage characteristics.

As described above, according to the one or more of the above embodiments of the present invention, a cross-linked polymer is provided that is capable of retaining phosphoric acid and having excellent mechanical strength. When the cross-linked polymer is used, an electrode and electrolyte membrane for a fuel cell with enhanced capability of retaining phosphoric acid at a wide range of temperature may be manufactured, leading to long-term durability, and enhanced proton conductivity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte membrane for a fuel cell, comprising a cross-linked polymer obtained through a cross-linking reaction of a polymer composition comprising:
 a block copolymer represented by Formula 4 below, and an oxazine-based monomer:

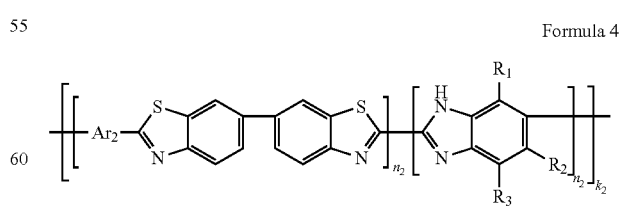

Formula 4 wherein, in Formula 4, $Ar_2$ is an unsubstituted $C_6$-$C_{20}$ arylene group, $R_1$ is a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, or a substituted or unsubstituted $C_3$-$C_{20}$ heteroaryloxy group, $R_2$ and $R_3$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbocyclic group or a $C_3$-$C_{20}$ heterocyclic group, $m_2$ is from 0.01 to 1, $n_2$ is from 0 to 0.99, and $k_2$ is from 10 to 250, wherein the oxazine-based monomer is represented by Formula 21 below

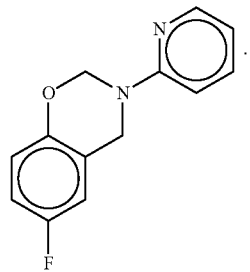

Formula 21

2. A fuel cell comprising:

a cathode;

an anode; and an electrolyte membrane disposed between the cathode and the anode, wherein at least one of the cathode, the anode and the electrolyte membrane comprises the cross-linked polymer obtained through a cross-linking reaction of a polymer composition comprising:

a block copolymer represented by Formula 4 below, and an oxazine-based monomer:

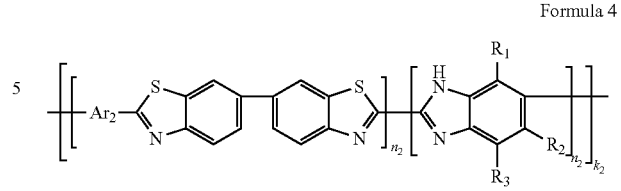

Formula 4 wherein, in Formula 4, $Ar_e$ is an unsubstituted $C_6$-$C_{20}$ arylene group, $R_1$ is a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_3$-$C_{20}$ heteroaryl group, or a substituted or unsubstituted $C_3$-$C_{20}$ heteroaryloxy group, $R_2$ and $R_3$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, or $R_2$ and $R_3$ may be linked to form a $C_4$-$C_{20}$ carbocyclic group or a $C_3$-$C_{20}$ heterocyclic group, $m_2$ is from 0.01 to 1, $n_2$ is from 0 to 0.99, and $k_2$ is from 10 to 250, wherein the oxazine-based monomer is represented by Formula 21 below

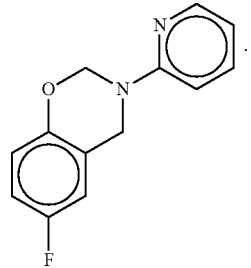

Formula 21

* * * * *